United States Patent
Marriott et al.

(10) Patent No.: US 11,160,369 B2
(45) Date of Patent: Nov. 2, 2021

(54) SHELVING SYSTEM

(71) Applicant: Supply Point Systems Limited, Rugby (GB)

(72) Inventors: Christopher Marriott, Rugby (GB); Iain Clark, Rugby (GB); David Prior, Rugby (GB); Christopher Benwell, Rugby (GB); Robert Bunce, Rugby (GB); Nathan Nicholson, Rugby (GB)

(73) Assignee: Supply Point Systems Limited, Rugby (GB)

(*) Notice: Subject to any disclaimer, the term of this patent is extended or adjusted under 35 U.S.C. 154(b) by 0 days.

(21) Appl. No.: 16/647,471

(22) PCT Filed: Sep. 14, 2018

(86) PCT No.: PCT/GB2018/052632
§ 371 (c)(1),
(2) Date: Jul. 13, 2020

(87) PCT Pub. No.: WO2019/053457
PCT Pub. Date: Mar. 21, 2019

(65) Prior Publication Data
US 2020/0275775 A1  Sep. 3, 2020

(30) Foreign Application Priority Data
Sep. 15, 2017 (GB) .................... 1714929

(51) Int. Cl.
*A47B 57/58* (2006.01)
*A47F 1/12* (2006.01)
(Continued)

(52) U.S. Cl.
CPC .......... *A47B 57/58* (2013.01); *A47F 1/12* (2013.01); *A47F 5/005* (2013.01); *A47F 5/0025* (2013.01);
(Continued)

(58) Field of Classification Search
CPC ...... A47B 57/58; A47B 96/025; G06Q 10/08; G06Q 10/087; G07F 9/026; B25H 3/04;
(Continued)

(56) References Cited

U.S. PATENT DOCUMENTS

| | | | | |
|---|---|---|---|---|
| 3,900,112 A | * | 8/1975 | Azzi | B65G 1/023 211/187 |
| 4,394,910 A | * | 7/1983 | Miller | B65G 1/023 211/134 |

(Continued)

FOREIGN PATENT DOCUMENTS

| | | |
|---|---|---|
| DE | 202014004232 U | 12/2017 |
| EP | 1473529 A1 * 11/2004 | ........... H03K 17/941 |

(Continued)

*Primary Examiner* — Jennifer E. Novosad
(74) *Attorney, Agent, or Firm* — Mintz, Levin, Cohn, Ferris, Glovsky and Popeo, P.C.

(57) ABSTRACT

A shelf system (1) comprises: a frame (5) for forming at least one shelf (70), and a plurality of primary and secondary rails (40, 50). The frame comprises a plurality of mounting portions (20, 30), to each of which at least one of a primary rail (40) and a secondary rail (50) is removably mountable to form lanes of different widths. Each lane includes a primary rail on one side and a secondary rail on the other side for supporting and guiding at least one item (60) in the lane, and the primary rails each comprise at least one sensor (700) for sensing the item (60) in the lane.

19 Claims, 21 Drawing Sheets

(51) Int. Cl.
　　　*A47F 5/00*　　　(2006.01)
　　　*A47F 10/02*　　　(2006.01)

(52) U.S. Cl.
　　　CPC ........ *A47F 10/02* (2013.01); *A47F 2010/025* (2013.01)

(58) Field of Classification Search
　　　CPC ............... G01G 1/044; G01F 23/2921; H01H 2239/002; H03K 17/941; H03K 17/968; A47F 1/12; A47F 10/02; A47F 2010/025; A47F 5/0025; A47F 5/005; A47F 1/04; A47F 2005/165; A47F 2010/005
　　　USPC .................. 211/175, 59.2, 186, 184, 151
　　　See application file for complete search history.

(56) References Cited

U.S. PATENT DOCUMENTS

| | | | | |
|---|---|---|---|---|
| 4,453,641 A | * | 6/1984 | Rasmussen | A47F 1/12 211/151 |
| 4,765,493 A | * | 8/1988 | Kinney | B65G 1/023 193/35 R |
| 5,115,920 A | * | 5/1992 | Tipton | B65G 1/023 211/151 |
| 5,259,518 A | * | 11/1993 | Sorenson | B65G 1/023 211/151 |
| 5,279,430 A | * | 1/1994 | Benton | B65G 1/023 211/151 |
| 5,295,591 A | * | 3/1994 | Slater | A47B 47/027 211/151 |
| 5,360,122 A | * | 11/1994 | Benton | A47F 1/12 211/151 |
| 5,474,412 A | * | 12/1995 | Pfeiffer | B65G 1/023 193/35 R |
| 5,593,048 A | * | 1/1997 | Johnson | A47F 1/04 211/184 |
| 5,845,794 A | * | 12/1998 | Highsmith | A47B 96/1441 211/189 |
| 6,105,798 A | * | 8/2000 | Gruber | B65G 1/023 211/151 |
| 6,332,547 B1 | * | 12/2001 | Shaw | A47F 1/12 211/59.2 |
| 6,533,131 B2 | * | 3/2003 | Bada | A47B 57/583 211/184 |
| 7,815,060 B2 | * | 10/2010 | Iellimo | B65G 1/023 211/151 |
| 8,113,360 B2 | * | 2/2012 | Olson | A47F 5/005 211/59.3 |
| 8,662,325 B2 | * | 3/2014 | Davis | A47B 57/585 211/151 |
| 9,038,804 B1 | * | 5/2015 | Nickell | A47B 96/021 193/35 R |
| 9,320,367 B2 | * | 4/2016 | Chambers | A47F 5/005 |
| 9,730,529 B2 | * | 8/2017 | Colelli | A47F 1/126 |
| 9,782,017 B1 | * | 10/2017 | Luberto | A47F 1/125 |
| D801,734 S | * | 11/2017 | Turner | D6/681.1 |
| 10,064,500 B2 | * | 9/2018 | Furui | B65G 1/023 |
| 10,154,739 B2 | * | 12/2018 | Turner | A47F 1/125 |
| 10,178,909 B2 | * | 1/2019 | Hardy | A47F 7/28 |
| 2001/0002659 A1 | | 6/2001 | Bada | |
| 2005/0150847 A1 | * | 7/2005 | Hawkinson | A47F 5/005 211/59.2 |
| 2005/0168345 A1 | * | 8/2005 | Swafford, Jr. | A47F 1/126 340/686.1 |
| 2005/0279722 A1 | * | 12/2005 | Ali | A47F 10/00 211/59.3 |
| 2011/0042334 A1 | * | 2/2011 | Sucevich | A47F 5/005 211/71.01 |
| 2011/0215060 A1 | * | 9/2011 | Niederhuefner | A47F 1/125 211/59.3 |
| 2012/0217212 A1 | * | 8/2012 | Czalkiewicz | A47F 1/12 211/59.2 |
| 2013/0327733 A1 | * | 12/2013 | Csak | G08B 13/02 211/59.3 |
| 2014/0114708 A1 | | 4/2014 | Campbell | |
| 2014/0124463 A1 | * | 5/2014 | Goehring | A47F 1/12 211/49.1 |
| 2016/0113421 A1 | * | 4/2016 | Muzyka | A47B 57/08 211/85.26 |
| 2017/0172315 A1 | * | 6/2017 | Hay | A47F 10/02 |
| 2017/0202369 A1 | * | 7/2017 | Mercier | G01B 21/16 |
| 2017/0220987 A1 | * | 8/2017 | Sun | G06Q 10/087 |
| 2017/0243155 A1 | * | 8/2017 | Reuter | A47F 5/108 |
| 2018/0184814 A1 | * | 7/2018 | Nagel | A47F 5/005 |
| 2020/0121097 A1 | * | 4/2020 | Lutz | A47F 3/001 |
| 2020/0275775 A1 | * | 9/2020 | Marriott | A47F 10/02 |

FOREIGN PATENT DOCUMENTS

| | | | | |
|---|---|---|---|---|
| WO | WO-2014107462 A1 | * | 7/2014 | ........ G01G 19/4144 |
| WO | WO-2017074891 A1 | | 5/2017 | |
| WO | WO-2017106764 A1 | | 6/2017 | |

\* cited by examiner

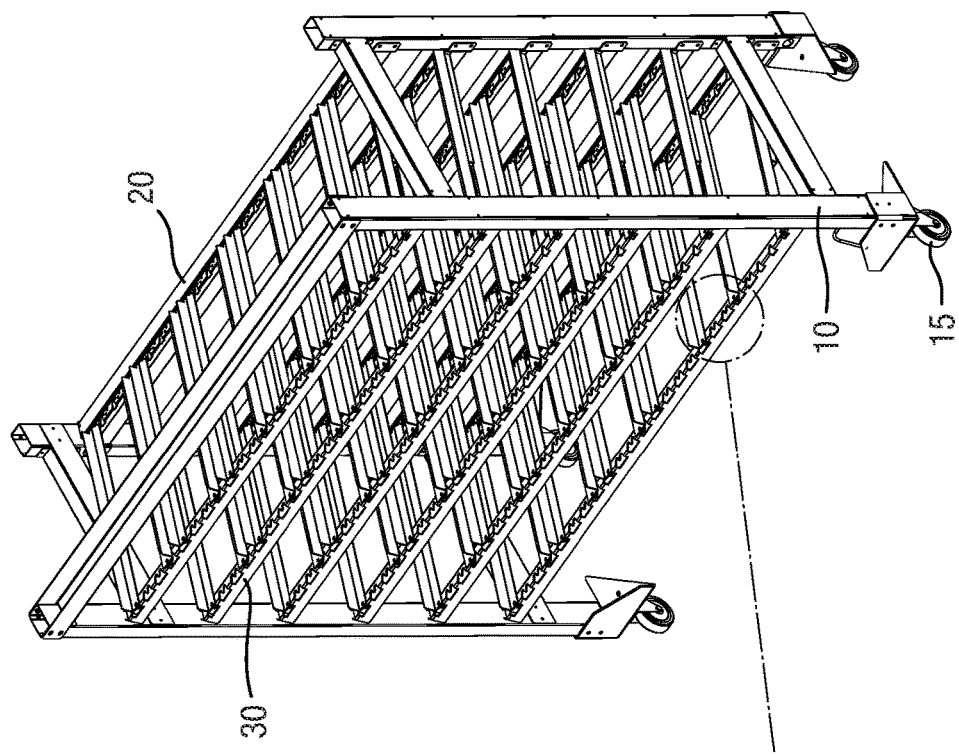
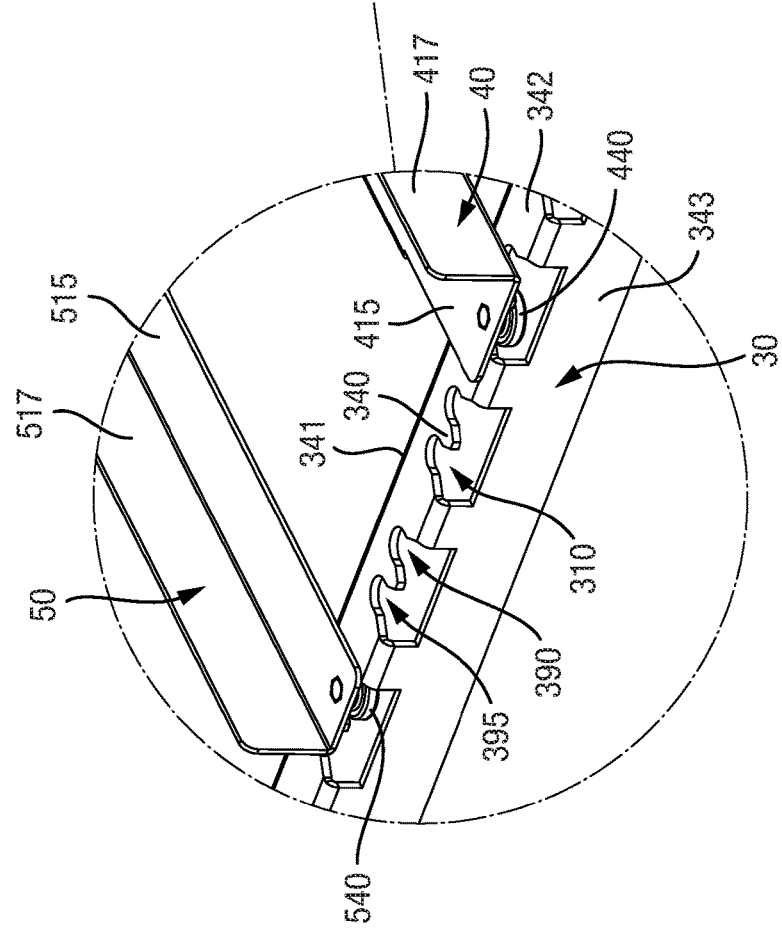
Fig. 12

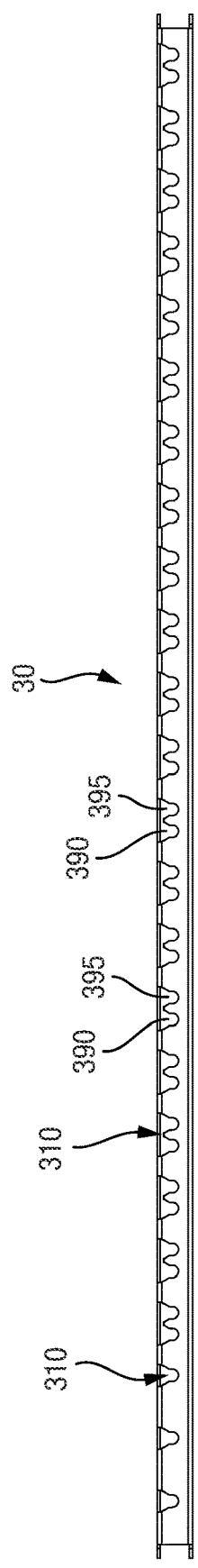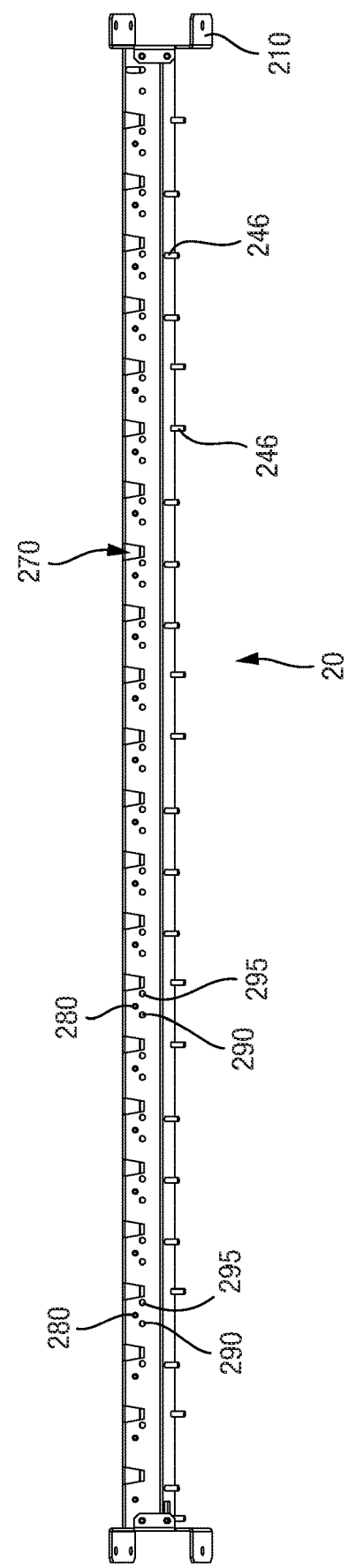

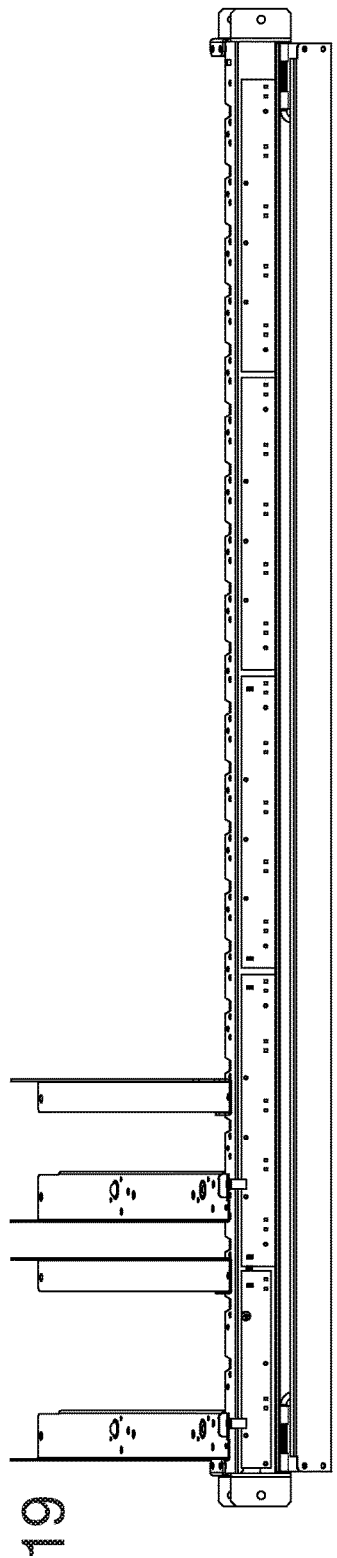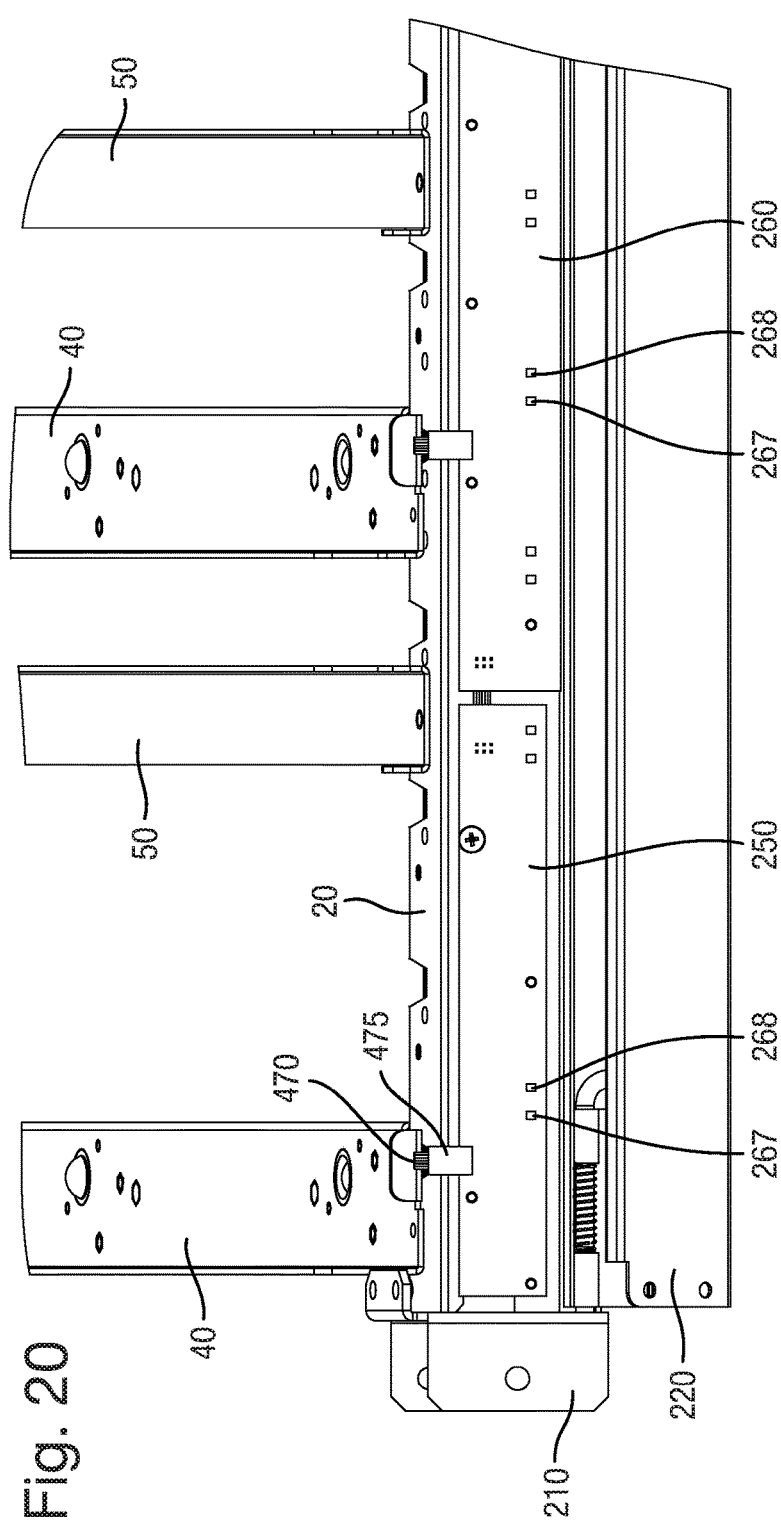

SHELVING SYSTEM

The present invention relates to a shelving system, which is preferably suitable for stock control and vendor-managed inventory (VMI).

BACKGROUND

Two bin kanban systems for stock control in a manufacturing environment are known. In existing systems, a shelf is provided with two bins for a stock item. The two bins are placed one behind the other on a pair of sloping, permanently fixed rails, which form a lane. A plurality of lanes is provided, each for holding a pair of bins. A user picks stock from the front bin. When the bin is empty, he removes it and draws the bin behind it to the front. The empty bin can be stacked in a pile to the side of the rack, or turned upside down and placed at the back of the lane.

In some known systems, a mechanical switch senses that a bin has been removed and switches on/off an LED at the front to indicate that stock replenishment is required. Such systems have several drawbacks, including that they cannot be easily assembled or reconfigured to operate with bins of different sizes.

SUMMARY OF INVENTION

According to a first aspect of the present invention, there is provided a shelf system comprising: a frame for forming at least one shelf, and a plurality of primary and secondary rails, wherein: the frame comprises a plurality of mounting portions, to each of which at least one of a primary rail and a secondary rail is removably mountable to form lanes of different widths, each lane includes a primary rail on one side and a secondary rail on the other side for supporting and guiding at least one item in the lane, and the primary rails each comprise at least one sensor for sensing the item in the lane.

Preferably, the frame includes a first cross member and a second cross member, to which respective parts of the primary and secondary rails are mounted.

Preferably, the mounting portions comprise: pairs of mounting portions on the second cross member, the mounting portions in a pair being spaced apart by a first distance, and the pairs of mounting portions being spaced apart by a second distance; primary rail mounting portions on the first cross member corresponding to one of mounting portions of the pairs of mounting portions on the second cross member; and secondary rail mounting portions on the first cross member corresponding to both the mounting portions of the pairs of mounting portions on the second cross member.

Preferably, the primary rail and the secondary rail comprise lugs (440, 510, 540) at opposite ends for engaging with the mounting portions.

Preferably, the lug at one end of the primary and secondary rails comprises a projection such as a dowel, screw or bolt, the lug at the other end of the primary and secondary rails comprises a foot and a leg of smaller width than the foot, the pairs of mounting portions are slots or openings through which the foot can be introduced so that the leg abuts the second cross member, and the primary rail mounting portions and the secondary rail mounting portions on the first cross member are holes sized to receive the projection.

Preferably, the first cross member is arranged forwards of and below the second cross member.

Preferably, each rail comprises a support portion for supporting the weight of part of the item and an upright projecting upwards from the supporting portion for guiding the item in the lane.

Preferably, the at least one sensor is disposed to detect a downward-facing surface of the item.

Preferably, the frame comprises an indicator for each lane, the position of the indicator relative to the position of the primary rail being the same for each lane.

Preferably, the at least one shelf comprises at least one shelf board, which optionally have indicators mounted, wherein the at least one sensor of each primary rail is connectable to a corresponding shelf board.

Preferably, the at least one of shelf board comprises separate electrical connectors for connecting a respective plurality of sensors.

Preferably, each primary rail comprises at least one sensor having a respective sensor board which is connected to a shelf board.

Preferably, if a primary rail draws current above a predetermined level, at least the primary rail is shut down and a lane notification is given.

Preferably, if a shelf board draws current above a predetermined level, the shelf board is shut down and a notification is given.

Preferably, the shelf boards comprise a shelf control board (250) connected to a frame controller (600) and at least one shelf expander board (260) connected to the shelf control board.

Preferably, if the shelf control board draws current above a predetermined level, the shelf is shut down and a shelf notification is given.

Preferably, the shelf expander boards are daisy-chained to the shelf control board.

Preferably, the shelf boards are provided with indicators corresponding to the lanes, and the shelf control board is provided with a sync clock, whereby indicators in a shelf are controlled with the same timing.

Preferably, there are a plurality of shelves and the frame controller is configured to send to all shelf control boards in the frame a data packet to reset their respective sync clocks, whereby indicators in the frame are controlled with substantially the same timing.

Preferably, a number or address is assigned to each lane via the shelf board associated with it.

Preferably, the item is a storage bin and the at least one sensor is adapted to sense a continuous face of bin and not to sense an open face of a bin.

Preferably, the sensor comprises: an emitter and a receiver which are provided on one side of the primary rail; and an interrupter arranged to be moved by the item on an opposite side of the primary rail in the lane to interrupt a signal between the emitter and receiver.

Preferably, the emitter and receiver are provided on a board mounted to the one side of the primary rail; the interrupter is provided in a housing mounted on the one side of the primary rail; the interrupter includes a main body with a domed or sloped surface which projects above the opposite side of the primary rail and a projection for moving between the emitter and receiver; and the interrupter is biased away from a position in which the projection is between the emitter and receiver.

Preferably, the system is configured to determine whether one or more items is present in a lane and, if fewer than a predetermined number of items is present in the lane, to place a corresponding stock order.

Preferably, the system is configured to display a status of each lane using at least one indicator corresponding to that lane.

Preferably, there are multiple frames each with one or more shelves.

According to another aspect of the present invention, there is provided a sensor for sensing the presence of an item on a surface, wherein the sensor comprises: an emitter and a receiver which are provided on one side of the surface; and an interrupter arranged to be moved by the item on an opposite side of the surface to interrupt a signal between the emitter and receiver.

Preferably, the emitter and receiver are provided on a board mounted to the one side of the surface.

Preferably, the interrupter is provided in a housing mounted on the one side of the surface; the interrupter includes a main body with a sloped surface which projects above the opposite side of the surface and a projection for moving between the emitter and receiver; and the interrupter is biased away from a position in which the projection is between the emitter and receiver.

Preferably, the sloped surface is a domed surface.

According to another aspect of the present invention, there is provided a rail removably mountable to shelf system for forming a lane, the rail comprising: a supporting portion for supporting the weight of part of an item in the lane; an upright projecting upwards from the supporting portion for guiding the item in the lane; and at least one sensor is disposed to detect a surface of the item.

Preferably, the sensor is disposed to detect a downward facing surface of the item which is supported by the supporting portion.

Preferably, there is a second supporting portion disposed on the opposite side of the upright, whereby the rail can be used for forming two adjacent lanes.

Preferably, the sensor is a sensor as described above.

According to another aspect of the present invention, there is provided a shelf system comprising: a frame for forming at least one shelf, and a plurality of rails as described above, wherein: the frame comprises a plurality of mounting portions, to each of which at least one said rail (40) is removably mountable to form lanes of different widths, Preferably, each lane further includes a secondary rail on the other side to the rail, for supporting and guiding the item in the lane.

Further aspects of the invention include methods of providing, assembling and configuring a shelving system, including moving primary and secondary rails to change lane widths.

BRIEF DESCRIPTION OF THE DRAWINGS

Embodiments of the invention will now be described by way of example only with reference to the accompanying drawings in which:

FIG. 12 is a perspective rear view of the shelving system and an enlarged view of part of a rear cross member with a primary rail and a secondary rail mounted to it;

FIG. 16A shows a plan view of the rear cross member;

FIG. 16B shows a plan view of the front cross member;

FIG. 19 is a front elevation of the front cross member with primary and secondary rails mounted to it;

FIG. 20 is an enlarged view of part of the front elevation of FIG. 19;

DETAILED DESCRIPTION

Figure 1:
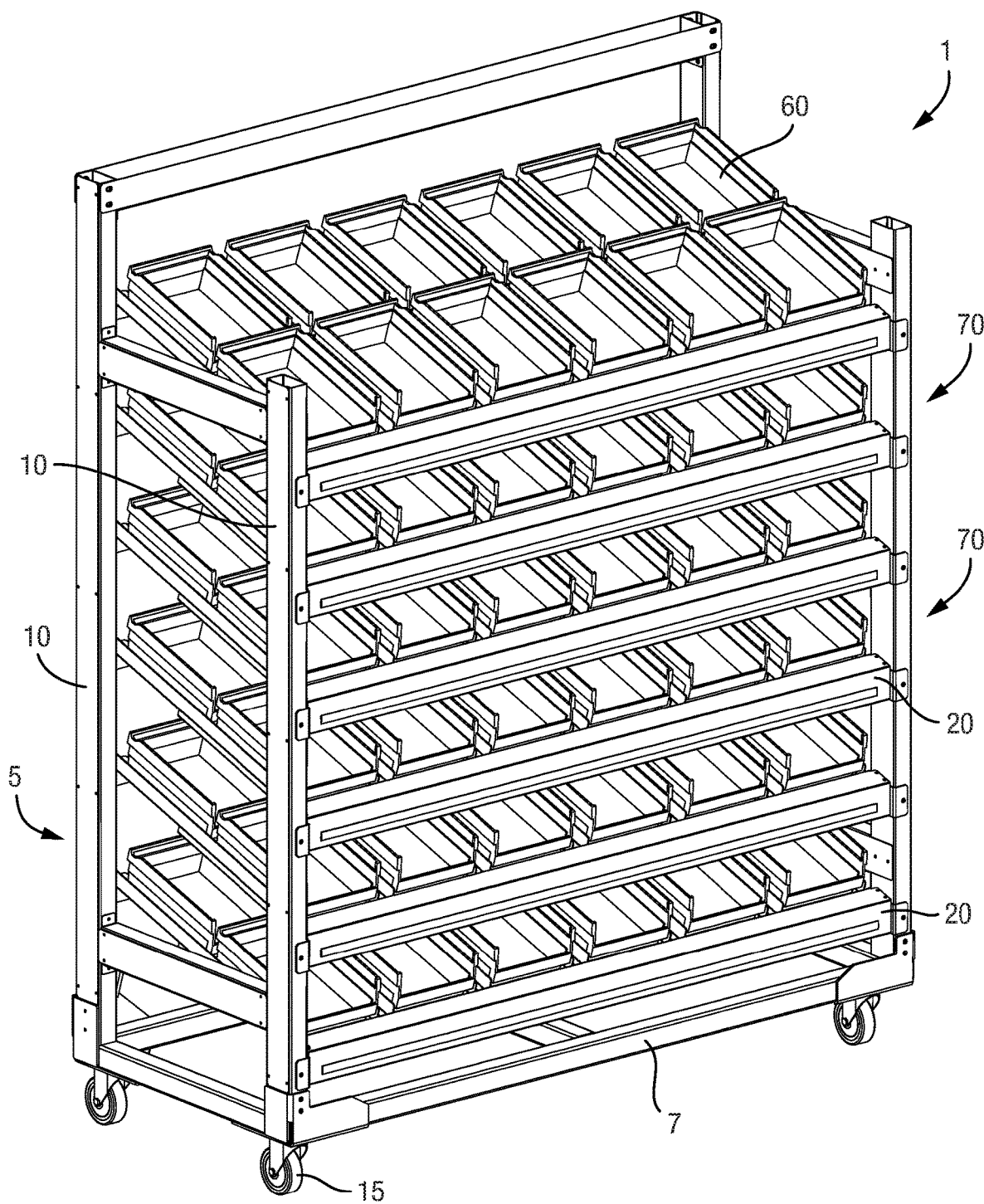
FIG. 1 is a perspective view of a shelving system according to an embodiment of the present invention.
Figure 2:
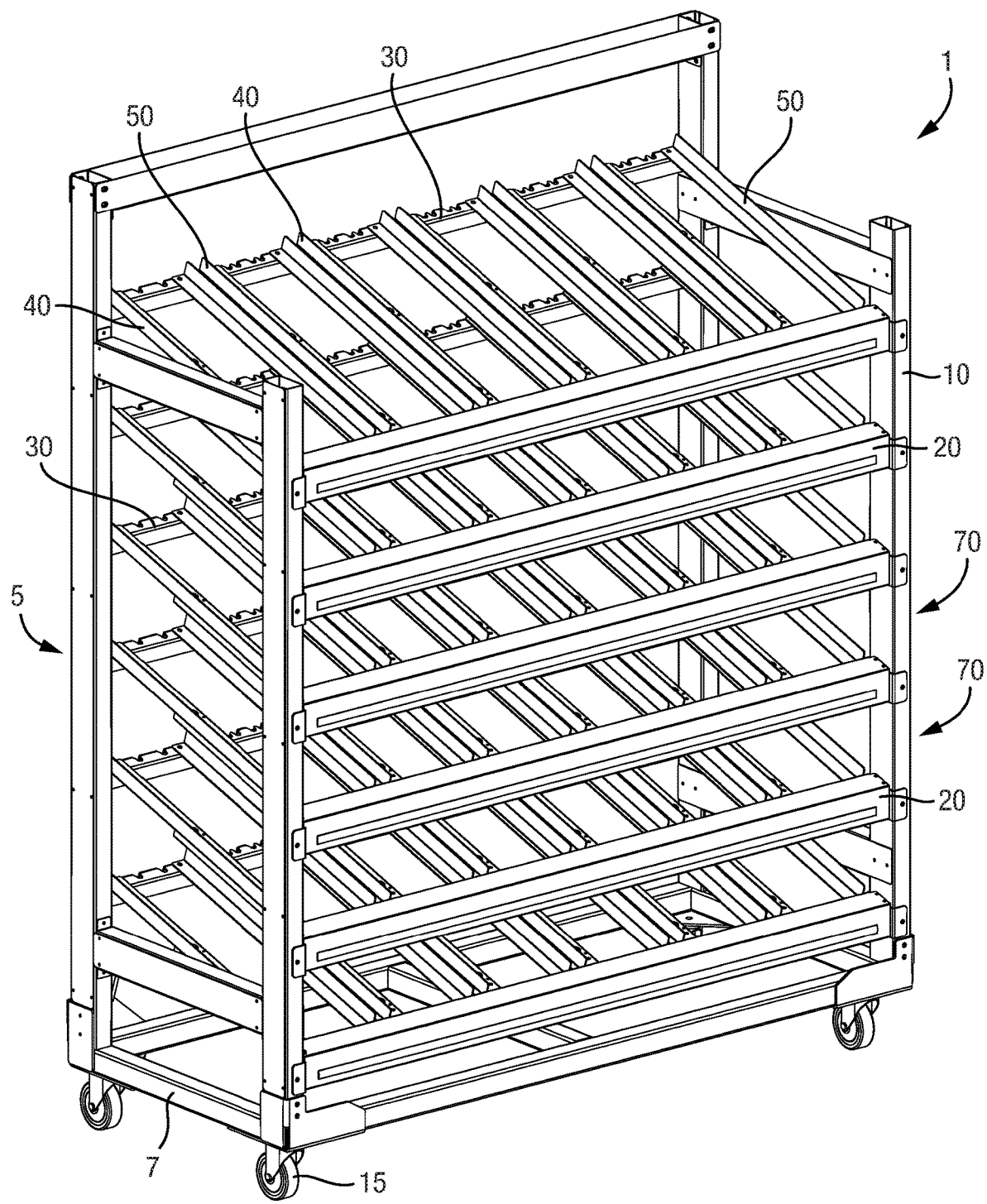
FIG. 2 is a perspective view of the shelving system in FIG. 1 in which the storage bins have been removed.
Figure 3:
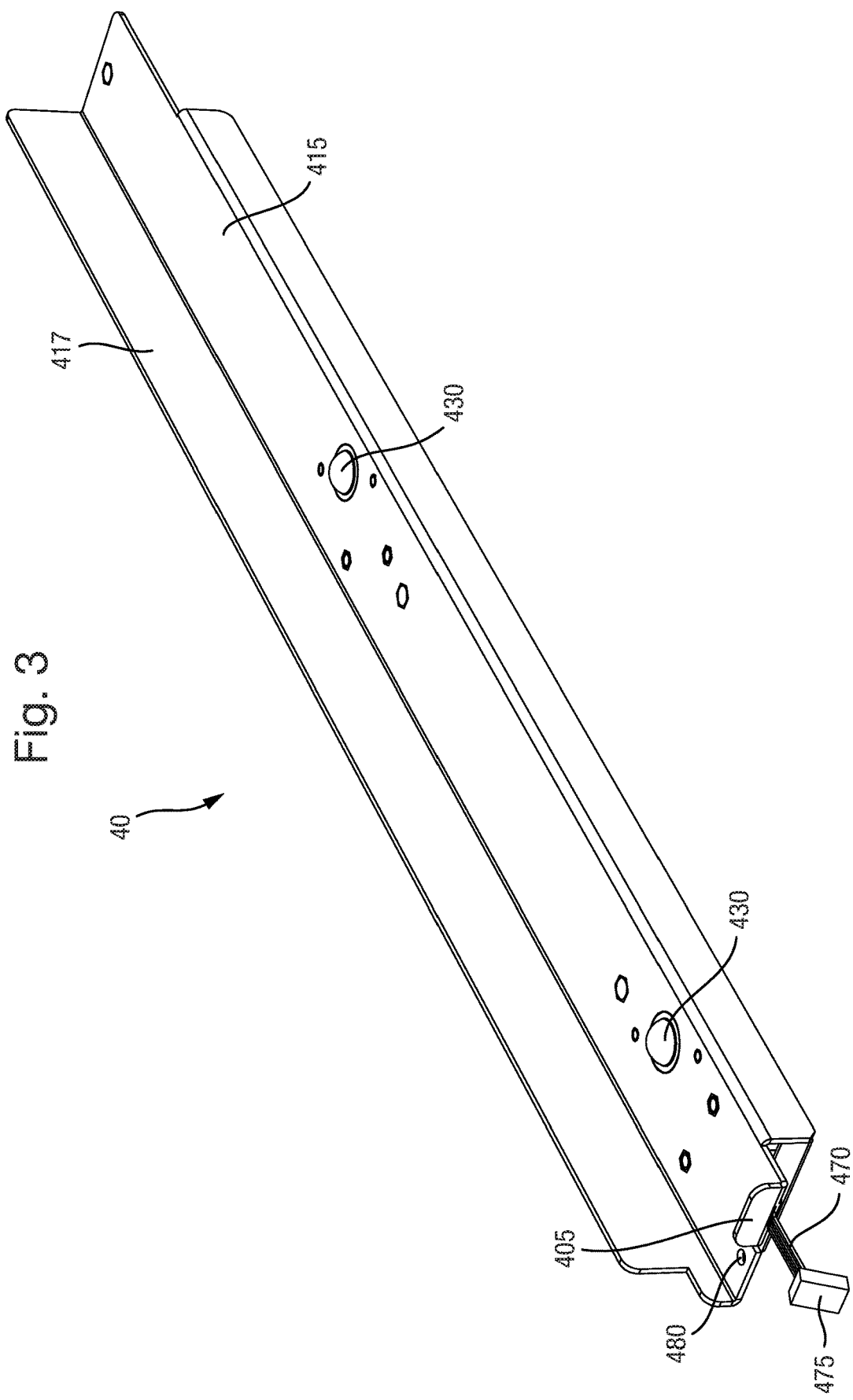
FIG. 3 is a perspective view of a primary rail of the embodiment.
Figure 4:
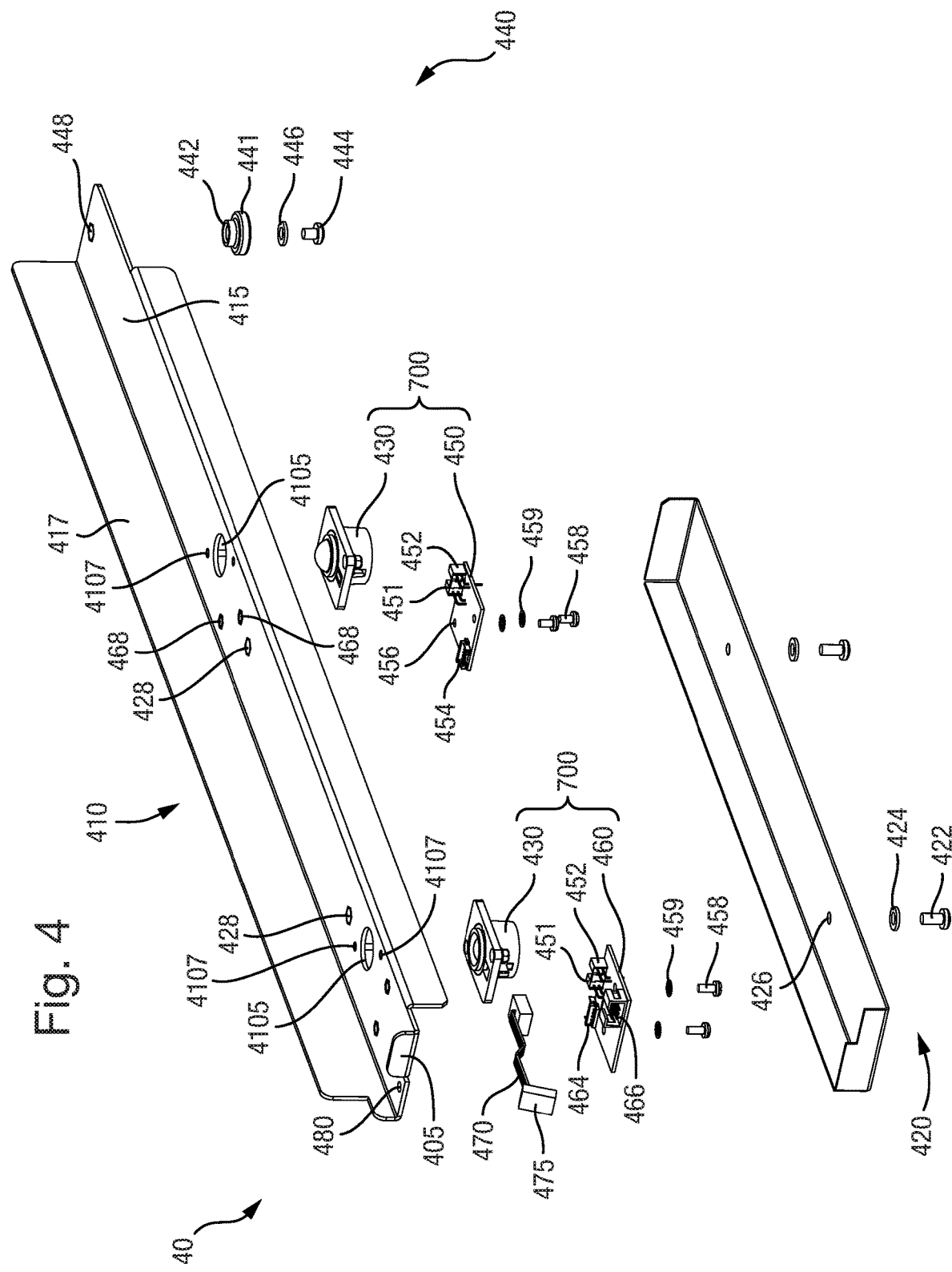
FIG. 4 is an exploded perspective view of the primary rail.
Figure 5:
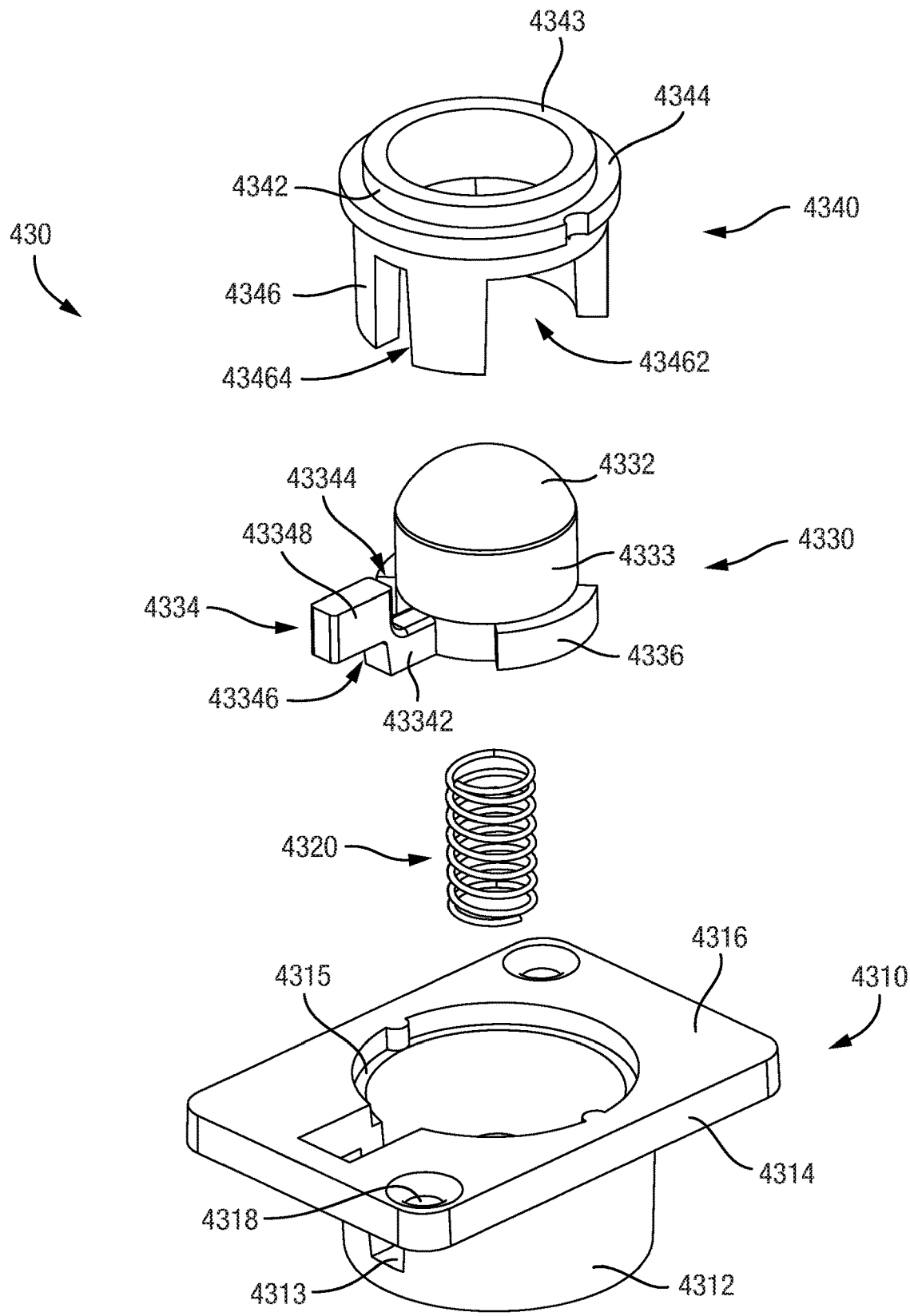
FIG. 5 is an exploded view of an interrupter and housing of a sensor according to an aspect of the invention.
Figure 6:
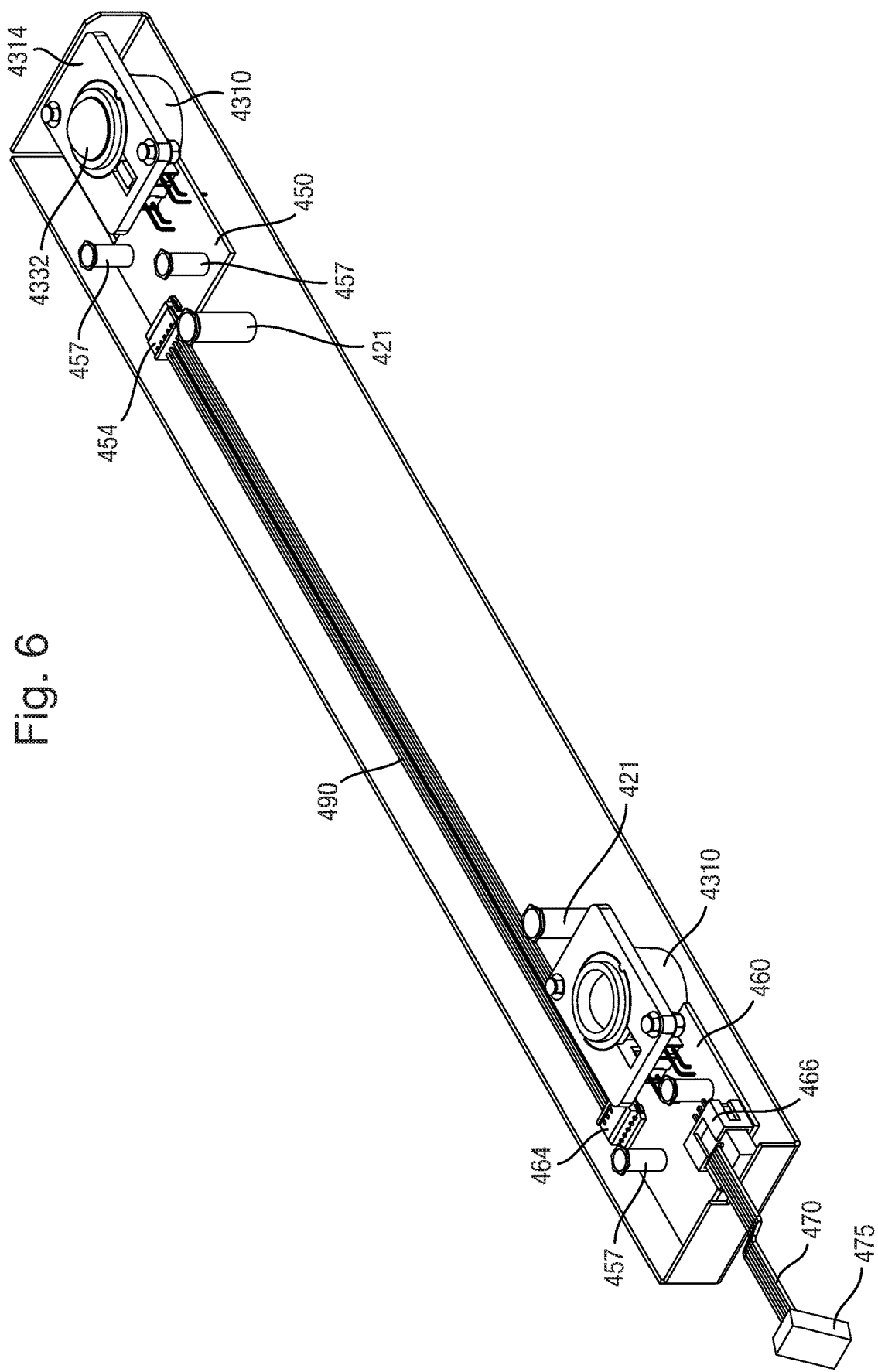
FIG. 6 is perspective view of the lower components of the primary rail.

As shown in FIGS. 1 and 2, the preferred embodiment of the present invention is a shelving system 1 suitable for vendor managed inventory (VMI) in which a plurality of shelves 70 each includes a plurality of lanes for holding storage bins 60. The system 1 includes a frame 5 including uprights 10 fixed on each corner of a base 5. Casters 15 are fixed to the lower corners of the base 7. A front cross member 20 and a rear cross member 30 are fitted to the uprights 10 for each shelf.

Each lane is formed by a primary rail 40 and a secondary rail 50, both of which are mounted at the forward end to the front cross member 20 and at the rear end to the rear cross member 30. A plurality of pairs of primary and secondary rails 40, 50 are mounted to form a plurality of lanes.

As shown in FIGS. 3 to 8, the primary rail 40 includes a support portion 415 and an upright guide portion 417, and the secondary rail 50 includes a support portion 515 and an upright guide portion 517. The bins 60 are supported on the support portions 415, 515 and guided to stay within the lane by the upright portions 417, 517. The front cross member 20 is positioned lower than the rear cross member 30 for each shelf 70 so that the lane slopes downwards towards the front. The top of the front cross member 20 is higher than the top the front end of the support portions 415, 515. In this way, if a bin 60 is placed at the back of an empty lane it will slide down the support portions 415, 515 until the front of the bin 60 abuts the top of the front cross member 20. If a second bin 60 is subsequently placed at the back, it will slide forward until it abuts the first bin 60. If the first bin 60 is then removed, the second bin 60 will then slide forward. Preferably, the primary and secondary rails are angled at substantially 18° so that the bins 60 slide forward under their own weight.

As shown in FIGS. 3 to 6, each primary rail is an assembly that comprises an upper rail portion 410, a lower housing 420 and two sensors 700. The upper rail portion 410 includes the support portion 415 and the upright guide portion 417. The support portion 415 is provided with a sensor hole 4105 for each of the sensors 700, sensor mounting holes 4107 for mounting (part of) the sensors 700, a hole 448 for mounting a rear lug 440, a front mounting hole 480, holes 428 for mounting the lower housing 420, and circuit board mounting holes 468 for mounting printed circuit boards 450, 460.

Each sensor 700 comprises a light emitter 451, a light receiver 452 and an interrupter assembly 430. The light emitter 451 and light receiver 452 of the front sensor 700 are provided on a front printed circuit board (PCB) 460, and the light emitter 451 and light receiver 452 of the rear sensor 700 are provided on a rear PCB 450. The front and rear sensor PCBs 450, 460 are fitted by means of spacers 457 (see FIG. 6), screws 458 and washers 459 to the bottom of the upper rail portion 410 using the circuit board mounting holes 468 at the front and rear. The front and rear PCBs 450, 460 are spaced apart from the bottom surface of the support portion 415 using the spacers 459, which may be formed integrally with the support portion 415 or fixed later. In this way, the light emitter 451 and light receiver 452 are provided between the PCB 450, 460 and the bottom surface of the support portion 415.

The rear PCB 450 includes a connector 454 and the front PCB includes a connector 464, which allows the two PCBs to be connected by means of a cable 490. In addition, the front PCB includes a further connector 466, which allows it to be connected to a shelf PCB (to be described later) by means of a cable 470 and plug 475.

In addition, each sensor 700 includes an interrupter assembly 430 (see FIG. 5) which includes a housing 4310, a coil spring 4320, an interrupter 4330 and a collar 4340. The housing 4310 includes a well 4312 and a flange 4314 provided around the upper end of the well 4312. The interrupter 4320 is held in the well 4312 by the collar 4340 with the coil spring 4320 disposed between the bottom of the well 4312 and the interrupter 4330 to bias the interrupter 4330 upwards away from the bottom of the well 4312 towards the collar 4340. A cylindrical projection (not shown) may be provided in the bottom of the well 4312 over which the spring 4320 may fit to locate and hold it in the well 4312.

The interrupter 4330 includes a cylindrical main body 4333 with a domed top 4332. It also includes a projection 4334 at the bottom of the main body 4333. The projection 4334 includes a first lower portion 43342 adjacent the bottom of the main body 4333 and second upper portion 43348 extending from the top outer corner of the first lower portion 43342. Thus, the projection 4334 includes an inner upper notch 43344 above the first lower portion 43342 and adjacent the main body, and a lower outer notch 43346 below the second upper portion 43348. The interrupter 4320 also includes lower flanges 4336 extending outwards on either side of the projection 4334.

The collar 4340 includes a lip 4344, which fits into a rim 4315 formed in the flange 4314 and surrounds the top of the well so that top of the lip 4344 is flush with the top 4316 of the flange 4314. A cylindrical body 4346 projects downward from the lip 4344 of the collar 4340 and fits in the well 4312. The cylindrical body 4346 includes a slot 43464 corresponding to the projection 4334 of the interrupter 4330 and notches 43462 corresponding to the lower flanges 4336.

A ring 4343 projects upwards above the lip 4344 and lies within the sensor hole 4105 when the assembly 430 is mounted to the bottom of the support portion 415. Mounting is carried out using screws and washers on a threaded stud (not shown) placed through the sensor mounting holes 4318 in the flange 4316 and corresponding holes 4107 in the support portion 415 such that the top 4316 of the flange 4314 abuts the lower surface of the support portion 415. The top 4343 of the ring 4342 is preferably flush or below the upper surface of the support portion 415.

When the interrupter assembly 430 is mounted to the bottom of the support portion 415 of the primary rail 40, the abutment of the rim 4344 against the bottom of the support portion 415 holds the collar 4340 in place with the interrupter 4330 sandwiched between the collar 4340 and the housing 4310. The coil spring biases the interrupter main body 4330 upwards so the domed surface 4332 projects above the upper surface of the support portion 415. The interrupter main body 4330 can travel up and down, with the projection 4334 travelling in the slot 43464 and the lower flanges 4336 travelling in the notches 43462. Upwards movement of the interrupter main body 4330 upwards is limited by abutment of the flanges 4336 with the tops of the slots 43462 and optionally by abutment of the top of the lower inner portion 43342 of the projection 4334 with the top of the slot 43464.

When a shelf bin 60 rests on the domed surface 4332, the interrupter 4330 is displaced downwards against the force of the coil spring 4320 and the outer upper portion 43348 of the projection 4334 is disposed between the emitter 451 and receiver 452 to block transmission of light. This signals that an item is present, which can be communicated to the corresponding shelf PCB 250, 260 (described later).

When the item is removed from the domed surface 4332, the biasing force of the spring 4320 acts to move the interrupter 4330 upwards so light emitted from the emitter 451 is no longer blocked from the receiver. This signals that an item is not present, which can be communicated to the shelf PCB 250, 260.

Once the front and rear sensor PCBs 450, 460 and the interrupter assemblies 430 have been mounted to the lower surface of the support portion 415 of the primary rail 40 and connected to one another, the lower housing 420 is fitted by means of spacers 421, screws 422 and washers 424 to bottom of the support portion 415 so that all the sensor components are enclosed by the support portion 415 and the housing 420 (apart from the domed surface 4332). The spacers 421 may be formed integrally with the support portion 415 or fixed later.

In a preferred embodiment, the interrupter main body 4330 can travel 6 mm in the housing and will start to interrupt the beam after about 3 mm of travel (half the stroke). Note that the interrupter 4330 of the front sensor 700 has been omitted from FIGS. 4 and 6.

The primary rail 40 also includes a rear mounting lug 440 fitted by means of screws 444 and washers 446 to the bottom of the support portion 415 using the rear lug hole 448. The rear mounting lug 440 comprises a foot 441 and a leg 442 having a smaller diameter than the foot 441.

Although not shown, a screw is also provided as the front mounting lug, which is passed through the front mounting hole 480 and screwed into the front cross member 20. A washer may also be used.

Figure 7:
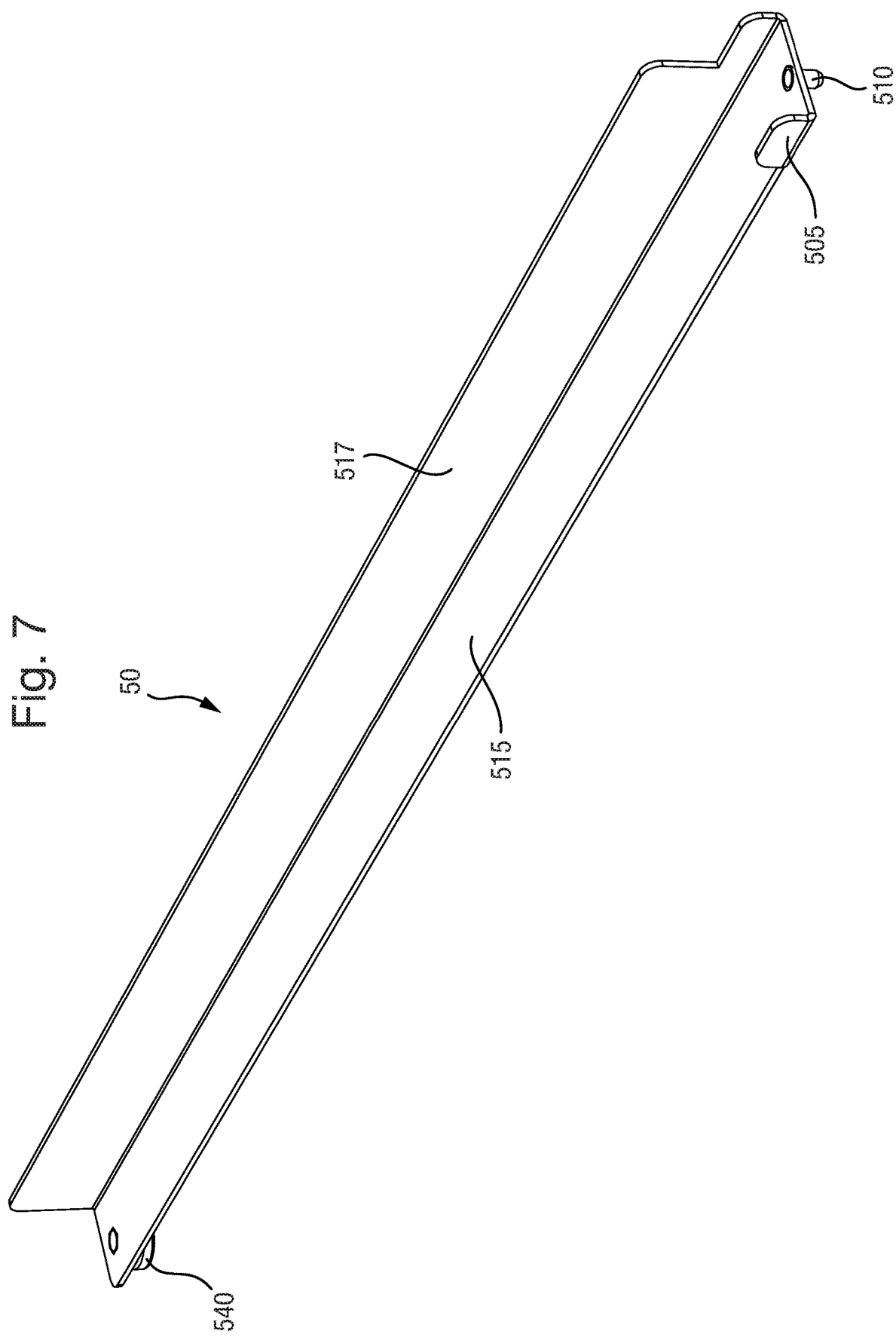
FIG. 7 is a perspective view of a secondary rail of the embodiment.
Figure 8:
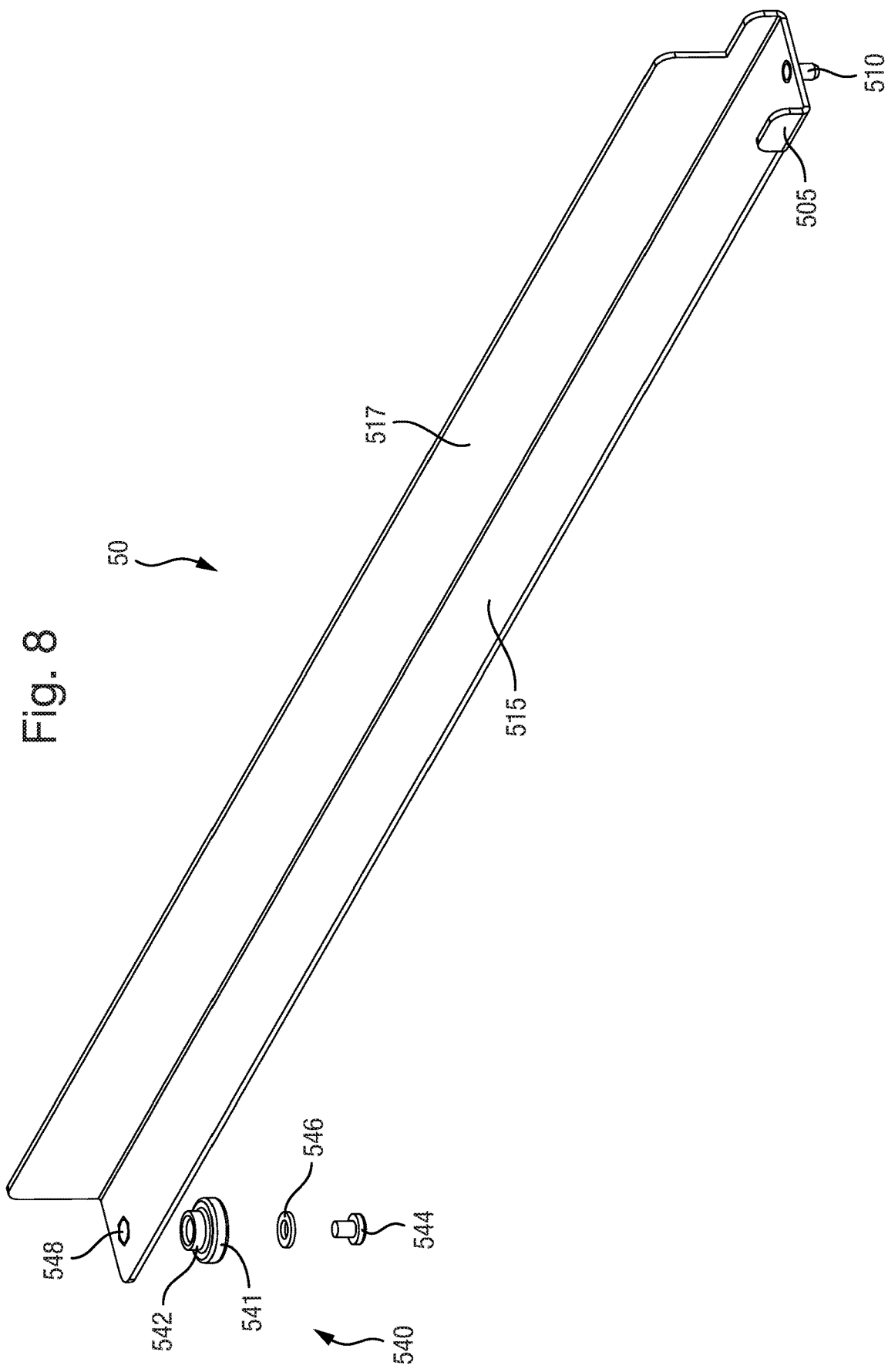
FIG. 8 is an exploded perspective view of the secondary rail.

As previously discussed and shown in FIGS. 7 and 8, the secondary rail 50 includes a support portion 515 and an upright guide portion 517. The secondary rail 50 is oppositely handed to the primary rail 40, which is to say that the support portion 515 is provided on the opposite side of the upright guide portion 517 compared to the primary rail. The secondary rail 50 also includes a rear mounting lug 540 fitted by means of screws 544 and washers 546 to the bottom of the support portion 515 using the rear lug hole 548. The rear mounting lug 540 comprises a foot 541 and a leg 542 having a smaller diameter than the foot 541. In addition, a front mounting lug 510 is provided at the front end of the secondary rail 50 in the form of a cylindrical rod or dowel, which may have a chamfered, pointed or rounded end.

Figure 9:
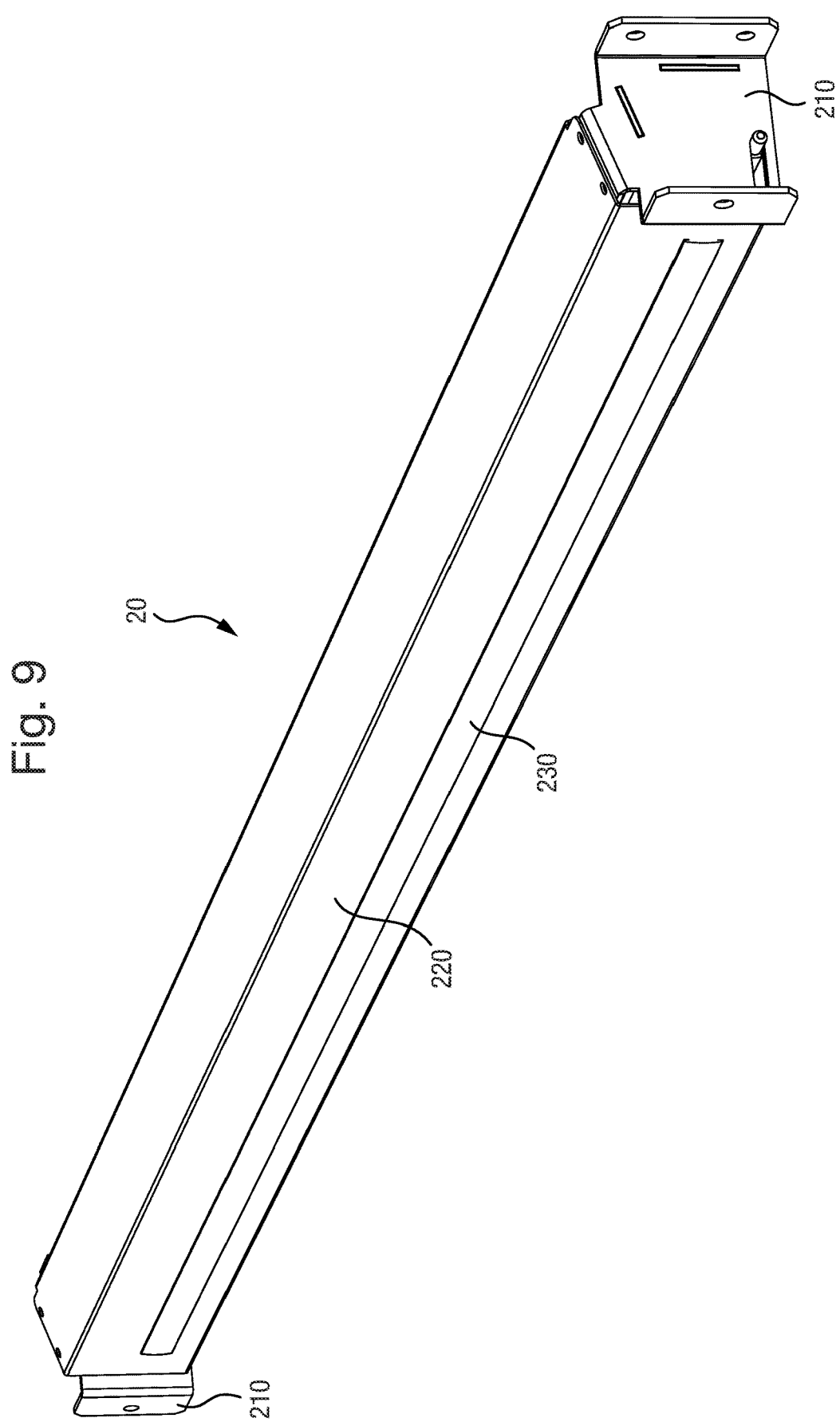
FIG. 9 is a perspective view of a front cross member of the embodiment.
Figure 10:
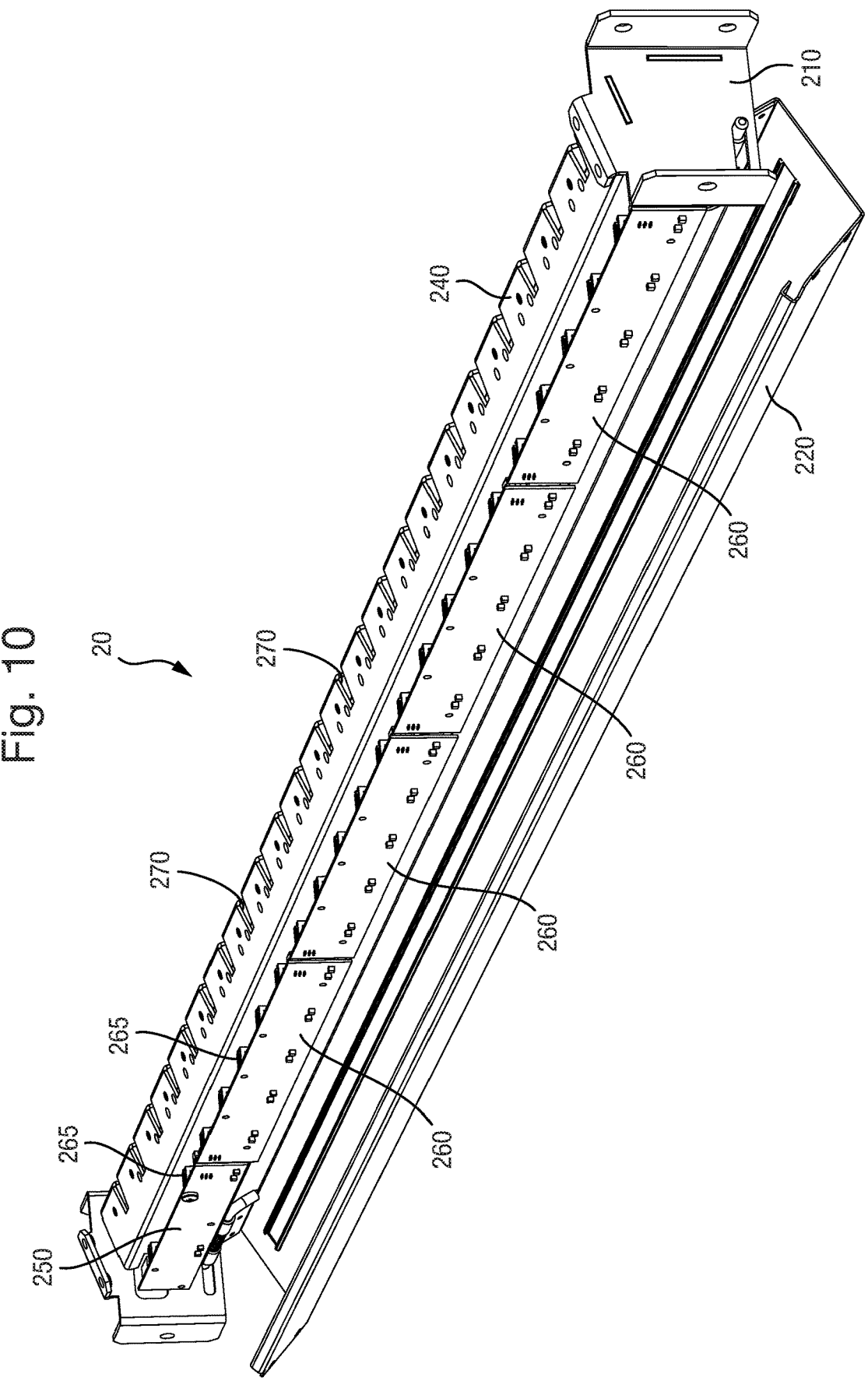
FIG. 10 is a perspective view of the front cross member in which the cover has been opened.
Figure 11:
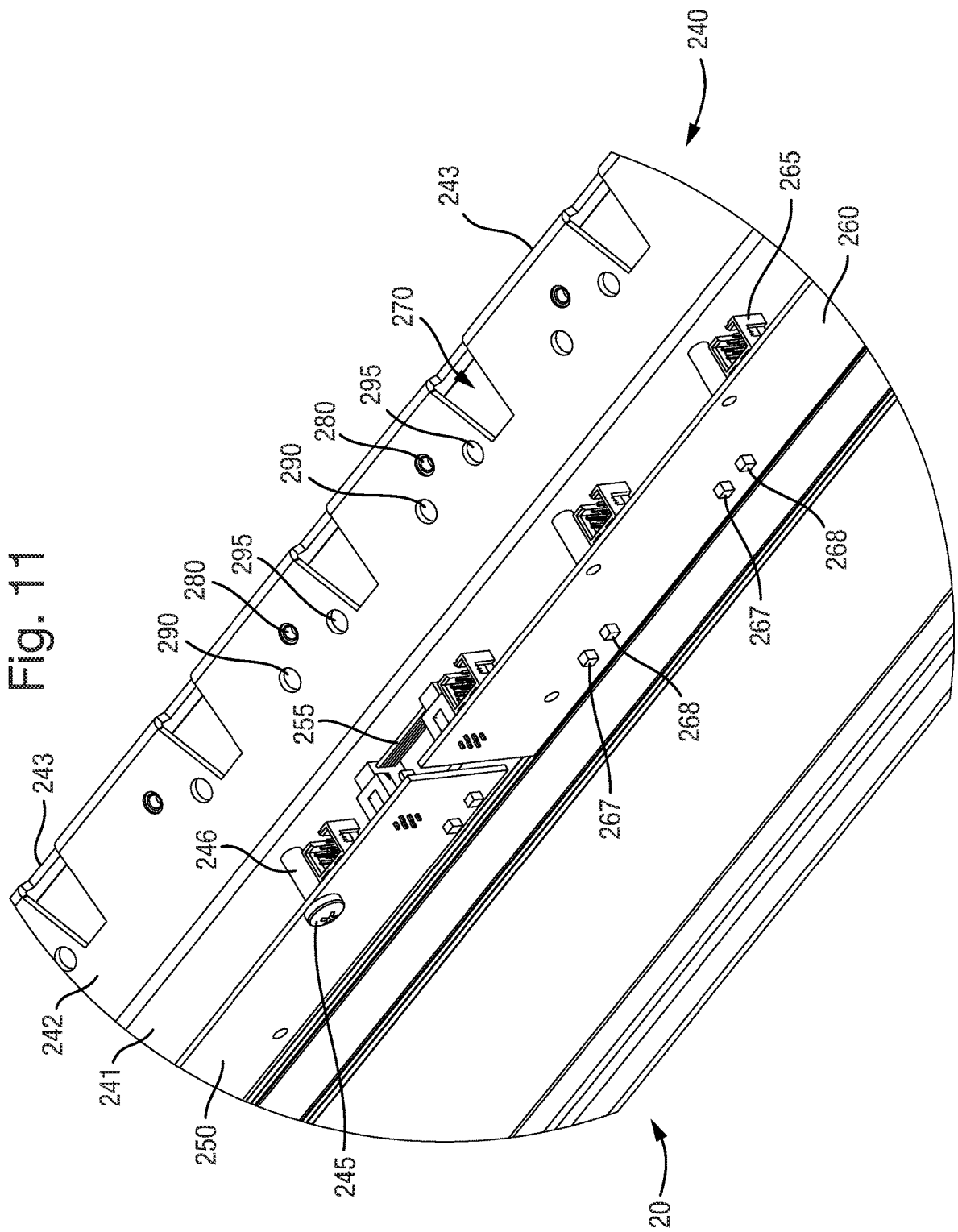
FIG. 11 is an enlarged view of a portion of the front cross member illustrated in FIG. 10.

The front cross member 20 is shown in FIGS. 9 to 11. As shown in FIG. 9, it includes a bracket 210 on either side for mounting to corresponding frame uprights 10 and a front cover 220 which is hinged to the front cross member main body 240. As shown in FIG. 9, the front cover 220 includes a window 230 through which light from LEDs 267, 268 provided behind the cover 220 can be seen. Preferably the window 230 is made of translucent material so that individual LEDs 267, 268 cannot themselves be seen and only the light they emit is visible.

The front cross member main body 240 includes a front cross member front portion 241, which is substantially vertical, a front cross member upper portion 242, which is at an angle to the horizontal corresponding to the angle of the primary and secondary rails 40, 50, and a front cross member rear portion 243 which projects down a short way from a rear edge of the upper portion 242. Behind the front cover 220, a shelf controller 250 and a plurality of shelf expanders 260 are mounted to the front portion 241 of the front cross member main body 240 with screws 245. In the present embodiment, the shelf controller 250 and shelf expanders 260 are provided as PCBs, which are spaced apart from the front portion 241 using spacers 246, which may be formed integrally with the front cross member main body 240 or fixed later. The shelf expanders 260 are connected to the shelf controller 250 in a daisy chain using cabling 255 between adjacent shelf PCBs.

The shelf controller PCB 250 and the shelf expander PCBs 260 all include a plurality of socket connectors 265, each for connecting to the plug connector 475 of the cabling 470 that is connected to the front PCB 460 of one of the primary rails 40. In other words, a primary rail 40 can be electronically connected to each of the sockets 265 of the shelf controller 250 and shelf expanders 260. Both the shelf controller PCB 250 and the shelf expander PCBs 260 include a pair of LEDs 267, 268 for each socket 265.

The front cross member main body 240 also includes a cabling notch 270 provided in the front cross member upper portion 242 corresponding to each socket connector 265. The cabling notch 270 extends to and is partially formed in the rear portion 243. The front cross member main body 240 also has a primary rail front lug hole 280 corresponding to each cabling notch 270, and a plurality of secondary rail front lug holes 290, 295. A screw (front mounting lug—not shown) can be fitted through the front mounting hole 480 of a primary rail 40 and screwed into a primary rail front lug hole 280 to fix the primary rail 40 to the front cross member 20. Similarly, the front mounting lug 510 of a secondary rail 50 can be inserted into a secondary rail front lug hole 290, 295 to fit the secondary rail 50 to the front cross member 20.

As shown in FIG. 12, the rear cross members 30 are mounted to the rear uprights 10 of the frame 5. Mounting can be carried out in any suitable way, for example by providing brackets at the ends of each rear cross member 30 and/or brackets at appropriate places on the rear uprights 10. The rear cross member 30 includes a rear cross member front portion 341, which is substantially vertical, a rear cross member upper portion 342, which is at an angle to the horizontal corresponding to the angle of the primary and secondary rails 40, 50, and a rear cross member rear portion 343 which projects down from a rear edge of the upper portion 342. The rear cross member 30 includes a plurality of mounting notches 310 provided in the upper portion 342. Each mounting notch 310 extends forwards from a rear edge of the upper portion 342 and terminates before the front edge of the upper portion 342. Each mounting notch 310 also extends partially downwards into the rear cross member rear portion 343. The width of the mounting notch 310 at the rear edge of the upper portion 342 and in the rear portion 343, and the depth of the mounting notch 310 in the rear portion 343 is sized to allow the foot 441, 541 of the rear mounting lugs 440, 540 of the primary and secondary rails 40, 50 to be inserted into the mounting notch 310 so that the foot is disposed below the lower surface of the upper portion 342.

Most of the mounting notches 310 include a protrusion 340, which projects backwards from the front and centre of the mounting notch 310 to split the mounting notch into first and second mounting parts 390, 395 on either side of the protrusion 340. Preferably the protrusion 340 does not extend as far back as the rear portion 343 of the rear cross member 30. In this manner, the width of the opening at the rear of each of the first and second mounting parts 390, 395 need not be as wide as the diameter of the foot 441, 541 of the primary and secondary rails 40, 50. However, each of the first and second mounting parts 390, 395 is wide enough to accommodate (at least part of) the leg 442, 542 for setting the position of the corresponding rail in the rear cross member 30.

To mount either a primary or secondary rail 40, 50 to the frame 5, the respective rear mounting lug 440, 540 is slid forward into the mounting notch 310 until the leg 442, 542 abuts the forward end of the mounting notch 310 (or, where they are provided, either one of the first and second mounting parts) with the foot 441, 541 disposed below the upper portion 342. In this way, part of the upper portion 342 is sandwiched between support portion 415, 515 of the rail and the foot 441, 541 of the lug 440, 540 as shown in FIG. 12. Consequently, the rear end of the rail 40, 50 is held in position in the rear cross member 30 but the front end is free to move up and down and to rotate left and right with the rear mounting lug 440, 540 acting as a pivot. The front end of the rail 40, 50 can then be swung into position for mounting to the front cross member 20.

In the case of a primary rail 40, the front mounting hole 480 is aligned with the corresponding primary rail front lug hole 280 provided in the front cross member 240 and the two are fixed together with a screw (or any other suitable lug, such as a dowel or rod). The plug 475 of the cabling 470 attached to the front sensor PCB 450 is then plugged into the socket connector 265 corresponding to the primary rail front lug hole 280. As shown in FIGS. 13-15 and 19, the cabling 470 passes forward of the front of the primary rail 40 through the cabling slot 270, lies over the upper portion 242 of the front cross member main body 240 and bends downwards to plug into the corresponding socket connector 265. This avoids the cabling 470 being pinched between the support portion 415 of the primary rail 40 and the front cross member 20.

In the case of a secondary rail 50, the front mounting lug 510 is simply fitted into the corresponding one of the secondary rail front lug holes 290, 295 provided in the front cross member main body 240.

When the front cover 220 is closed, it covers the stop portions 405, 505 provided at the front ends of the primary and secondary rails 40, 50. This prevents the front ends of the rails 40, 50 from being lifted away from the front cross member 20.

To remove the rails 40, 50 first the front cover is first opened. To remove the primary rail 40, it is a simple case of unplugging the cabling 470, unscrewing the screw acting as the front mounting lug, lifting the front end of the rail and sliding it backwards so the foot 441 slides out of the mounting notch 310.

To remove the secondary rail 50, it is a simple case of lifting the front end of the rail and sliding it backwards so the foot 541 slides out of the mounting notch 310.

Consequently, the primary and secondary rails 40, 50 can be mounted in pairs to form a lane between them. It should be noted that the width of the support portion 415 of the primary rail 40 is greater than the width of the support portion 515 of the secondary rail 50. In addition, the front mounting hole 480 is set off from the middle of the support portion 415 in the width direction towards the side of the upright guide portion 417, whereas the domed surface 4332 is set off to the other side. By contrast, the front mounting lug 510 is in the middle of the width of the support portion 515 of the secondary rail 50. Consequently, the width of the lane formed between the upright guide portions 417, 517 of the primary and secondary rails 40, 50 is greater than the distance between the front mounting hole 480 of the primary rail 40 and the front mounting lug 510 of the secondary rail 50, and therefore greater than the distance between the corresponding primary rail front lug hole 280 and secondary rail front lug hole 290, 295 used to mount the rails to the front cross member 20.

FIGS. 16A to 18 show the pattern of the primary and secondary rail front lug holes 280, 290,295 and the cabling grooves 270 on the front cross member 20, and the corresponding pattern of the mounting notches 310, including the pairs of first and second mounting parts 390, 395 where provided, on the rear cross member 30.

Figure 17:
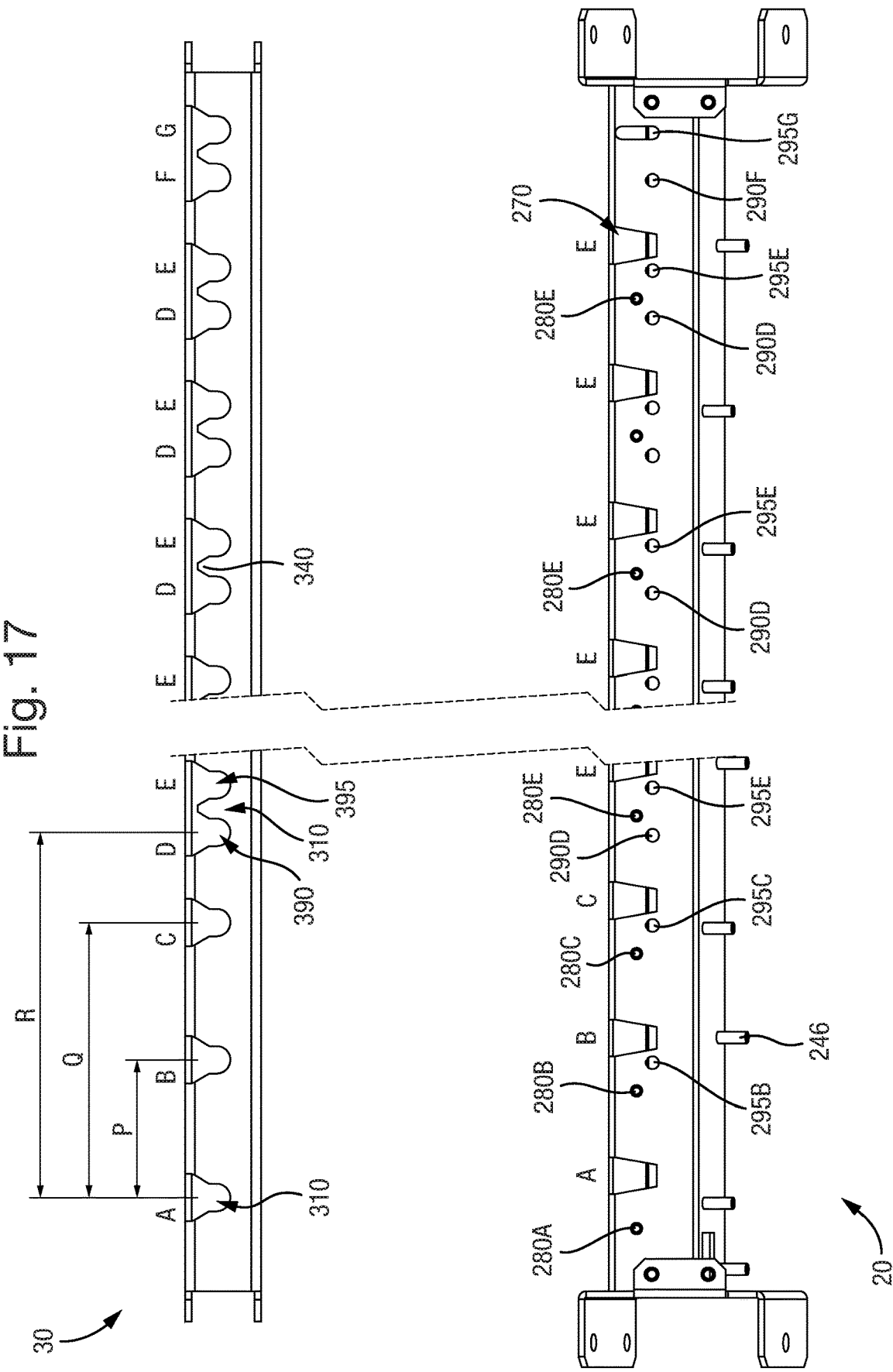
FIG. 17 is an enlarged view of part of the plan view of FIG. 16A and FIG. 16B.

As most clearly illustrated in FIG. 17, the mounting notches 310, including the pairs of first and second mounting parts 390, 395, allow mounting of a foot 441, 541 of either the primary rail 40 or the secondary rail 50 at positions A, B, C, D, E, F and G in which positions A, B and C are provided at the left hand side of the rear cross member 30, positions D and E are then formed by the pairs of first and second mounting parts 390, 395 being repeated at constant intervals moving from left to right all the way up to positions F and G at the right hand end of the rear cross member 30.

In the front cross member 20, a primary rail front lug hole 280 and a cabling notch is provided corresponding to positions A, B, C and all E. They are not provided at any position D, F or G. This means that a primary rail can be mounted at all positions A, B, C and E but not at any position D, F or G. In addition, a secondary rail front lug hole 290 is provided at positions D and F and a secondary rail front lug hole 295 is provided at all positions B, C, E and G. This means that a secondary rail 50 can be mounted at all position B, C, D, E, F and G but not at position A.

Figure 18:
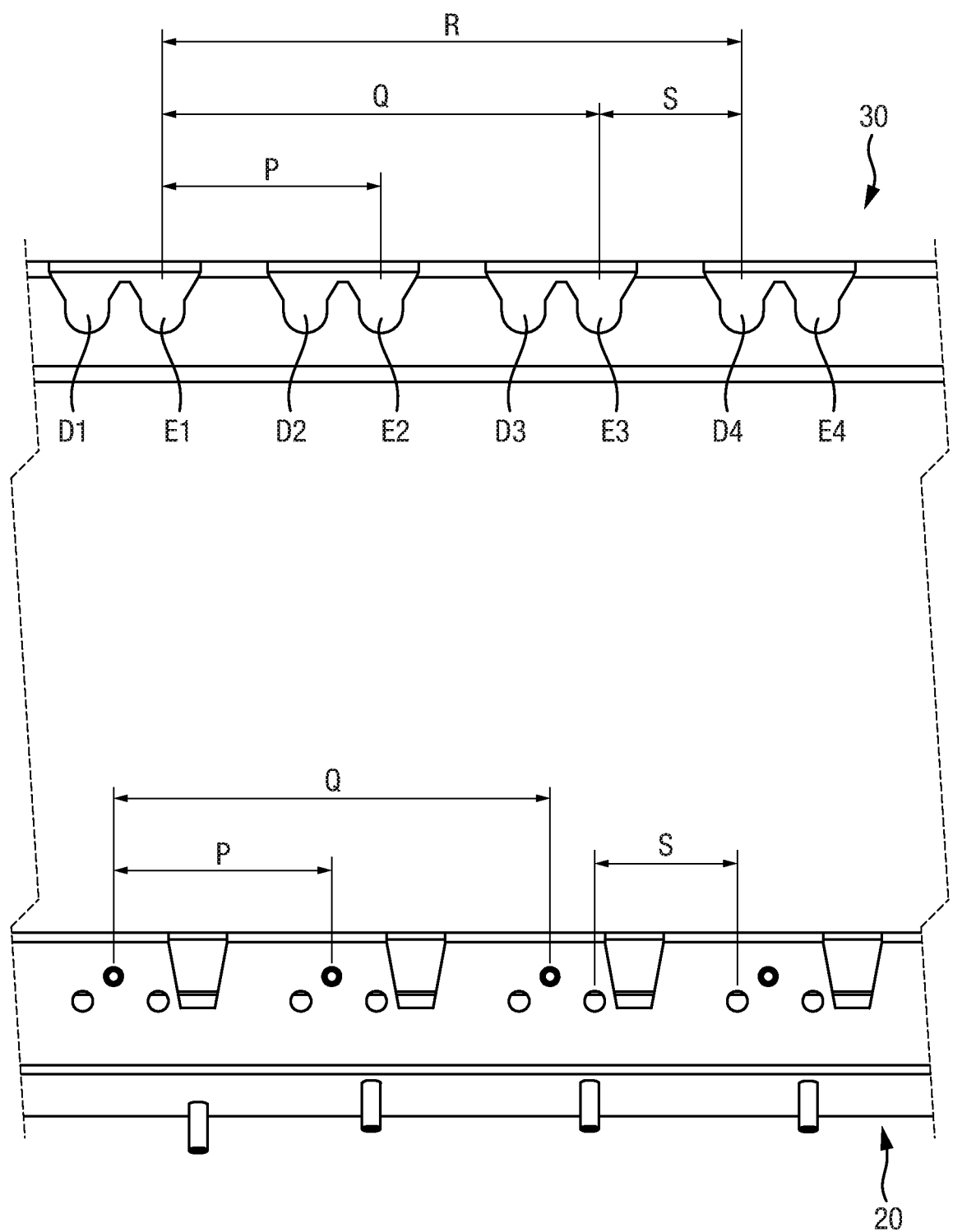
FIG. 18 is an enlarged view of another part of the plan view of FIG. 16A and FIG. 16B.

As illustrated in FIG. 18, this pattern of the mounting features on the front cross member 20 and rear cross member 30 allows lanes of three spacings (in relative terms narrow, medium and wide) to be consistently formed across the width of a shelf 70.

In more detail, if a primary rail 40 is mounted at position E (1), then a narrow lane can be formed by positioning the adjacent secondary rail 50 in the adjacent position E (2). The distance between the rear mounting features (second mounting parts 395) in the rear cross member 30 is distance P. As previously mentioned, the width of the narrow lane will actually be wider than distance P due to the positioning of the respective upright guide portions 417, 517 of the primary and secondary rails 40 and 50 being positioned outside the front mounting hole 480 and the front mounting lug 510 respectively, and outside the rear mounting lugs 440, 540 respectively, in the lane width direction. The primary rail 40 of the adjacent lane to the right-hand side can be fitted at the next adjacent position E (3).

On the other hand, if a primary rail is mounted at position E (1), then a medium width lane can be formed by positioning the adjacent secondary rail in the next but one position E (3)—that is the second position E in the right-hand direction, with an intermediate position E (2) in between them. The next but one position E (3) is a distance Q away from the first position E (1), where Q=2P. The width of the medium lane will be a distance P wider than the width of the narrow lane. However, in the present embodiment, the width of the medium lane will not be double the width of the narrow lane in view of the offset of the upright guide portions 417, 517 described above. The primary rail 40 of the adjacent lane to the right-hand side can be fitted at the next adjacent position E (4).

Finally, if a primary rail is mounted at position E (1), then a wide lane can be formed by positioning the adjacent secondary rail in the next but two position D (4)—that is the third position D in the right-hand direction, with two intermediate positions D (2 and 3) in between them. The rear of the next but two position D (4) is a distance R away from the first position E (1), where R=Q+S. Here, S is the distance between a position E (3, for example) and the next position D (4) to the right. The width of the wide lane will be a distance S wider than the width of the medium lane. The primary rail 40 of the adjacent lane to the right-hand side can be fitted at the next but one position E (5, not shown) since, in the present embodiment the combined offsets of the upright guide portions 417, 517 from the rear mounting lugs 440, 540 means there is not sufficient room to fit the next primary rail in the position E (4) directly adjacent to and to the right of the position D (4) to which the secondary rail is mounted. In other embodiments, the design of the mounting features and offset of the upright guide portions may make this possible.

FIG. 18 also shows the distances P, Q and S as applied to the mounting features on the front cross member 20. In particular, each group of a cabling notch 270, a primary rail front lug hole 280, a secondary rail front lug hole 290 and a secondary rail front lug hole 295 is spaced apart from the adjacent group by the pitch P. In addition, the right hand secondary rail front lug hole 295 in one group (position E) is spaced apart from the left hand secondary rail front lug hole 290 of the adjacent group to the right (position D) by the distance S.

Figure 13:
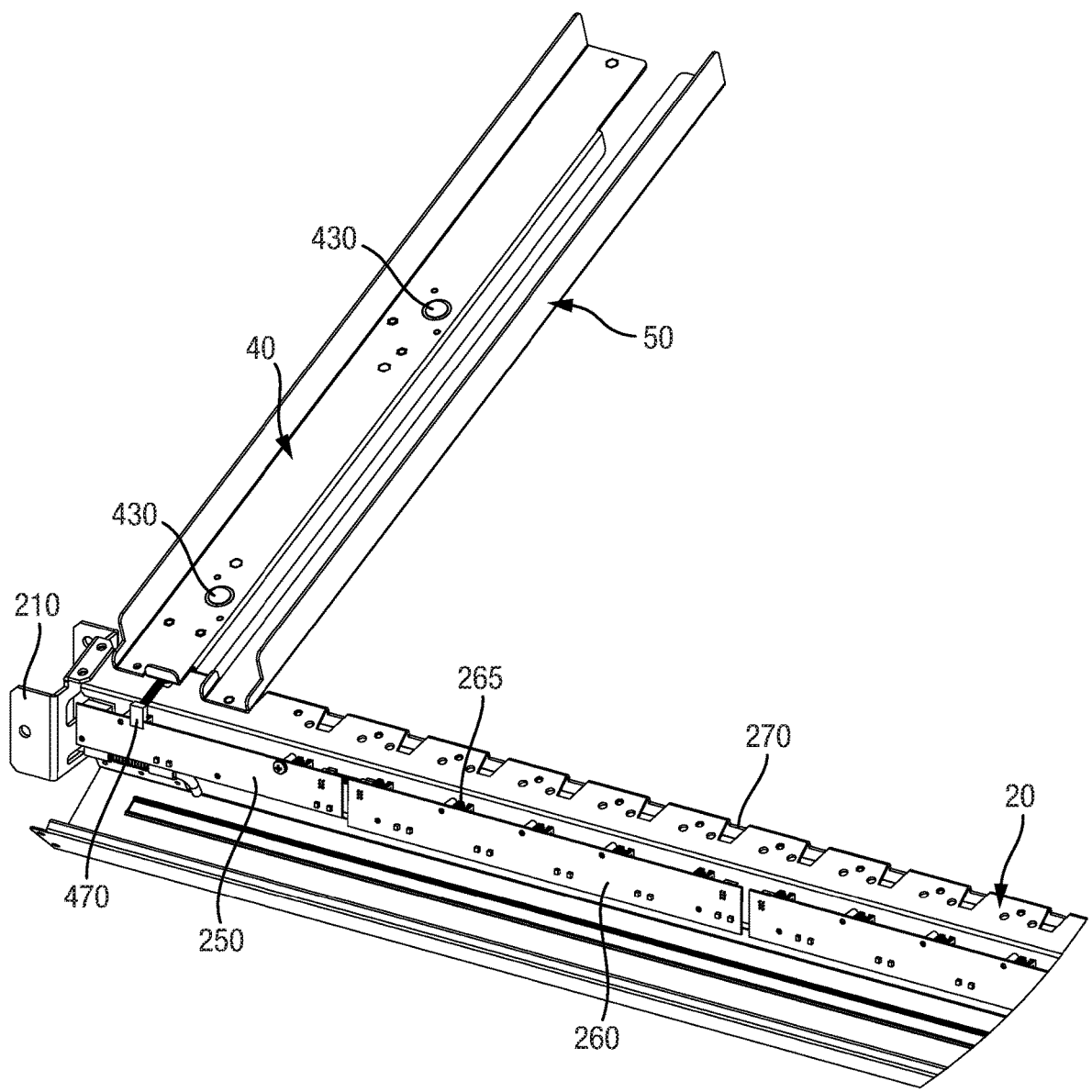
FIG. 13 is a partial perspective view of a corner of a shelf in the embodiment in which primary and secondary rails are mounted to form a narrow lane.
Figure 14:
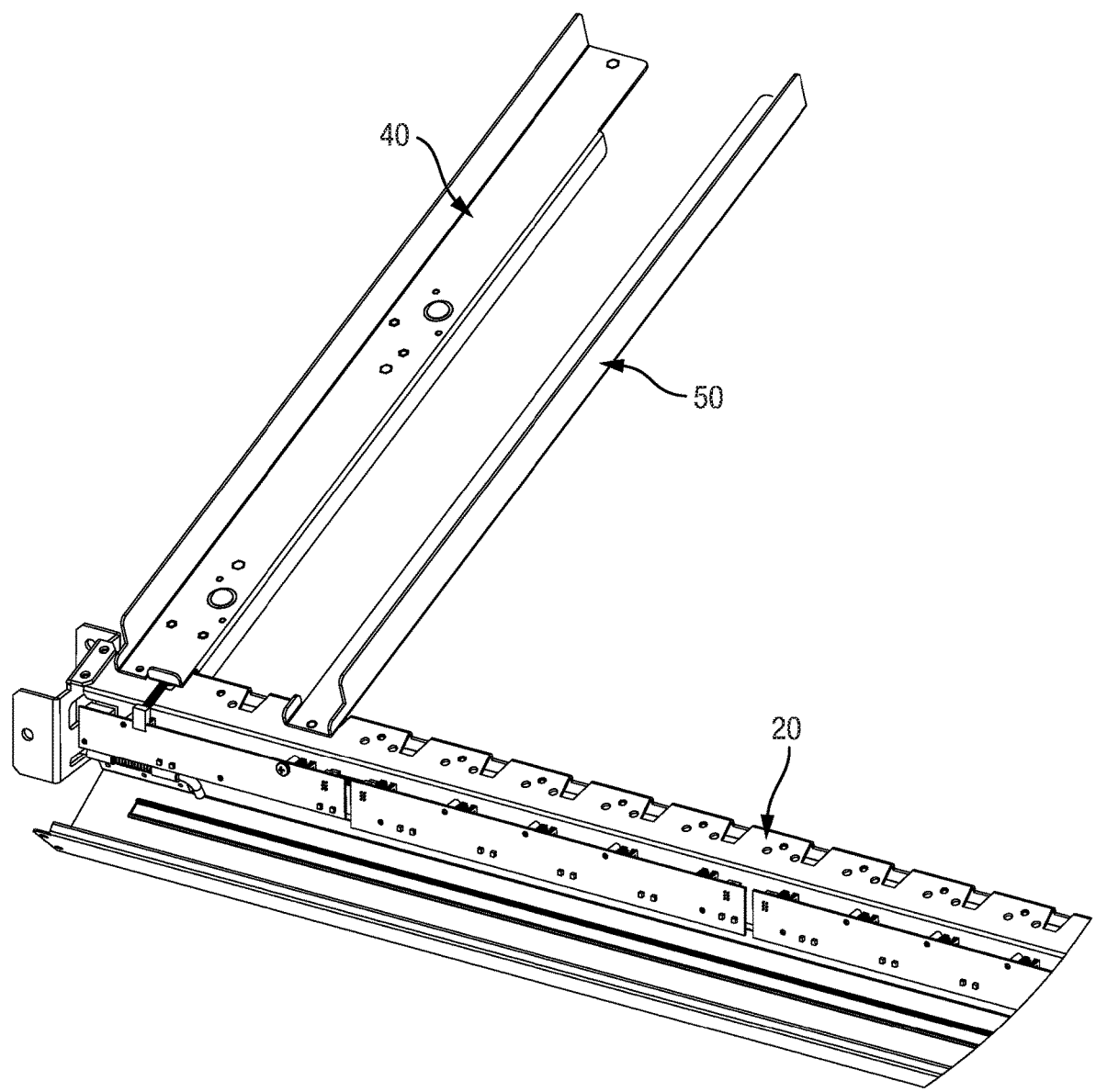
FIG. 14 is a partial perspective view of a corner of a shelf in the embodiment in which primary and secondary rails are mounted to form a medium width lane.
Figure 15:
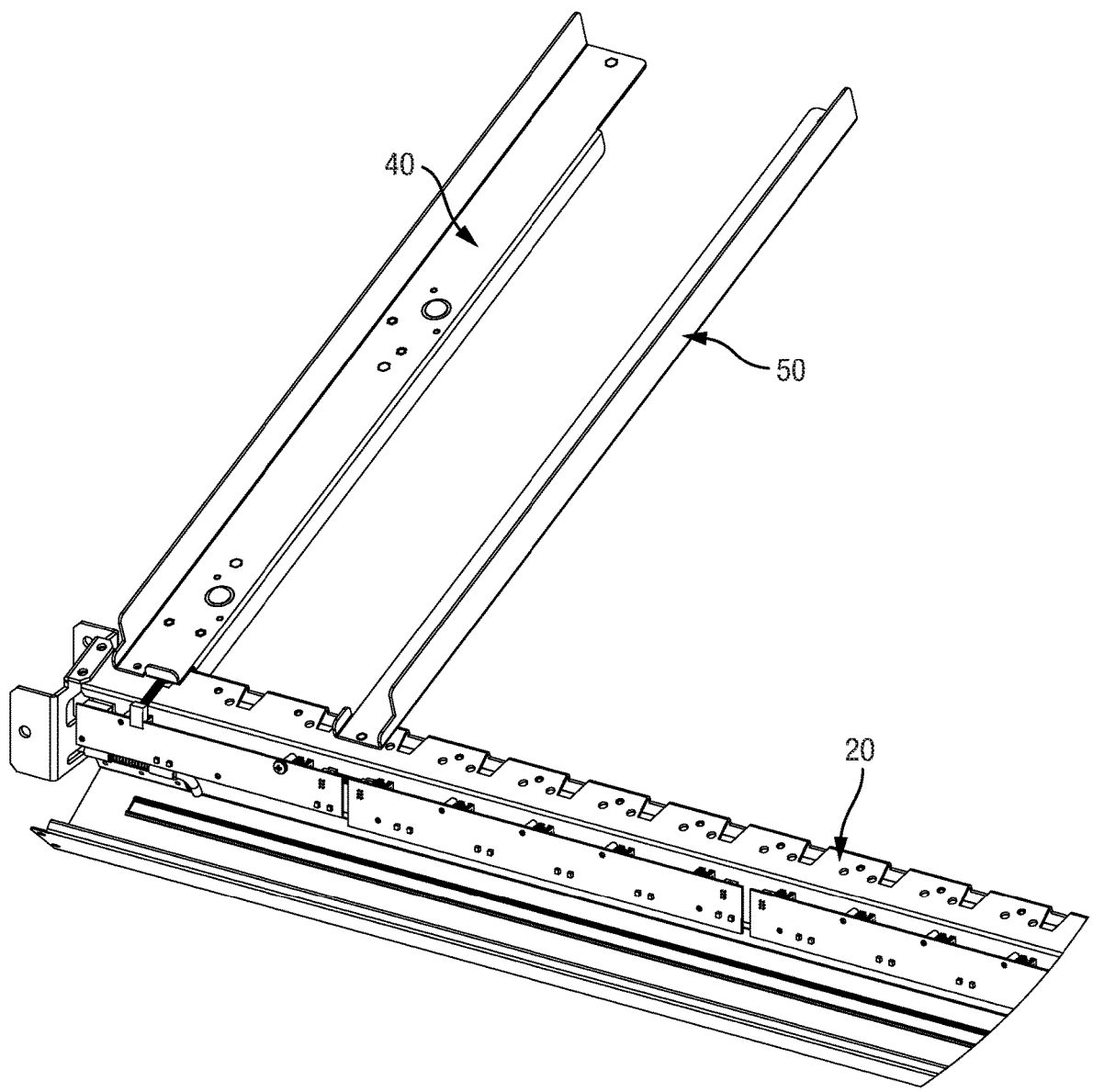
FIG. 15 is a partial perspective view of a corner of a shelf in the embodiment in which primary and secondary rails are mounted to form a wide lane.

At the left-hand end of the front cross member 20 and rear cross member 30, position B is spaced a distance P away from position A, position C is spaced a distance Q away from position A, and position D is spaced a distance R away from position A. This means that when a primary rail 40 is at position A, a narrow lane can be formed by placing a secondary rail 50 at position B, a medium lane can be formed by placing a secondary rail 50 at position C, and a wide lane can be formed by placing a secondary rail 50 at position D. FIGS. 13-15 respectively show narrow, medium and wide lanes being formed in this way. In the case of the narrow and medium lanes, the primary rail 40 for the next lane to the right can be fitted at the first position E. By contrast, for the wide lane, the primary rail 40 for the next lane to the right can be fitted at the second position E.

It should be noted that whilst it is possible to fit a primary rail 40 at position B (that is, a primary rail front lug hole 280, a cabling notch 270 and a mounting notch 310 are provided at position B), in the present embodiment no connector 265 is provided in the shelf controller PCB 250 corresponding to position B. Thus, a primary rail 40 cannot be electronically connected to the frame 5 at this position. In other embodiments, a connector 265 and associated circuitry may be provided at position B in a shelf PCB 250, 260.

At the right-hand end of the front cross member 20, if a secondary rail 50 is at position G, then a narrow lane is formed when a primary rail 40 is positioned at the rightmost position E, and a medium lane is formed when primary rail 40 is positioned at the position E second from the right. By contrast, if a secondary rail 50 is formed at position F, then a wide lane is formed if a primary rail is position at position E third from the right.

It will therefore be apparent that the design of the mounting features and their patterning on the front cross member 20 and the rear cross member 30 allows the primary and secondary rails 40, 50 to be fitted to the frame 5 at different positions easily and quickly, so that shelves can be simply configured to have lanes of different widths. Moreover, by using the shelf PCBs 250, 260 and the sensor PCBs 450, 460 with socket connectors 265, the electronics of the primary rail (especially the sensors 700) can be quickly connected to the frame 5. The shelf system of the present invention is therefore very easily configurable.

In one preferred embodiment, P=63.5 mm, Q=122 mm, R=168.5 mm and S=41.5 mm. With these dimensions and appropriate design of the primary and secondary rails 40, 50, it is possible to provide three lane widths of suitable dimensions to hold and guide commercially available storage bins 60 from AKRO-MILS® having respective external widths at the top of the bins of 4.125", 8.375" and 11.125". It should be noted that these bins are wider at the top than at the base and the lanes and widths of the support portions 415, 515 of the primary and secondary rails 40, 50 are sized to support both an upside-down bin and a bin the right way around. These commercially available bins all have a standard height of 4" and a length of 11.875".

As noted above and apparent from FIGS. 13-15, 19 and 20, each possible position of the primary shelf (positions A, C and E) is associated with a pair of LEDs 267, 268 on either the shelf controller PCB 250 or a shelf expander PCB 260. The position of the LEDs 267, 268 relative to a primary rail 40 that has been mounted is consistent irrespective of the actual position of the primary rail 40. This makes it possible always to signal a status of the lane associated with the primary rail 40 in a clear and consistent manner.

(Incidentally, FIGS. 19 and 20 show primary and secondary rails 40, 50 mounted to form a wide lane on the far left and a medium-width lane to the right of it).

Preferably, each LED 267 and each LED 268 is a multi-colour single device package with a red LED and a green LED on the same silicon, which allows the display of red ON, green ON or both ON (amber). They may also be controlled to flash green, red and amber in any combination of one, two or more and in any desired order and with any desired timing.

Figure 21:
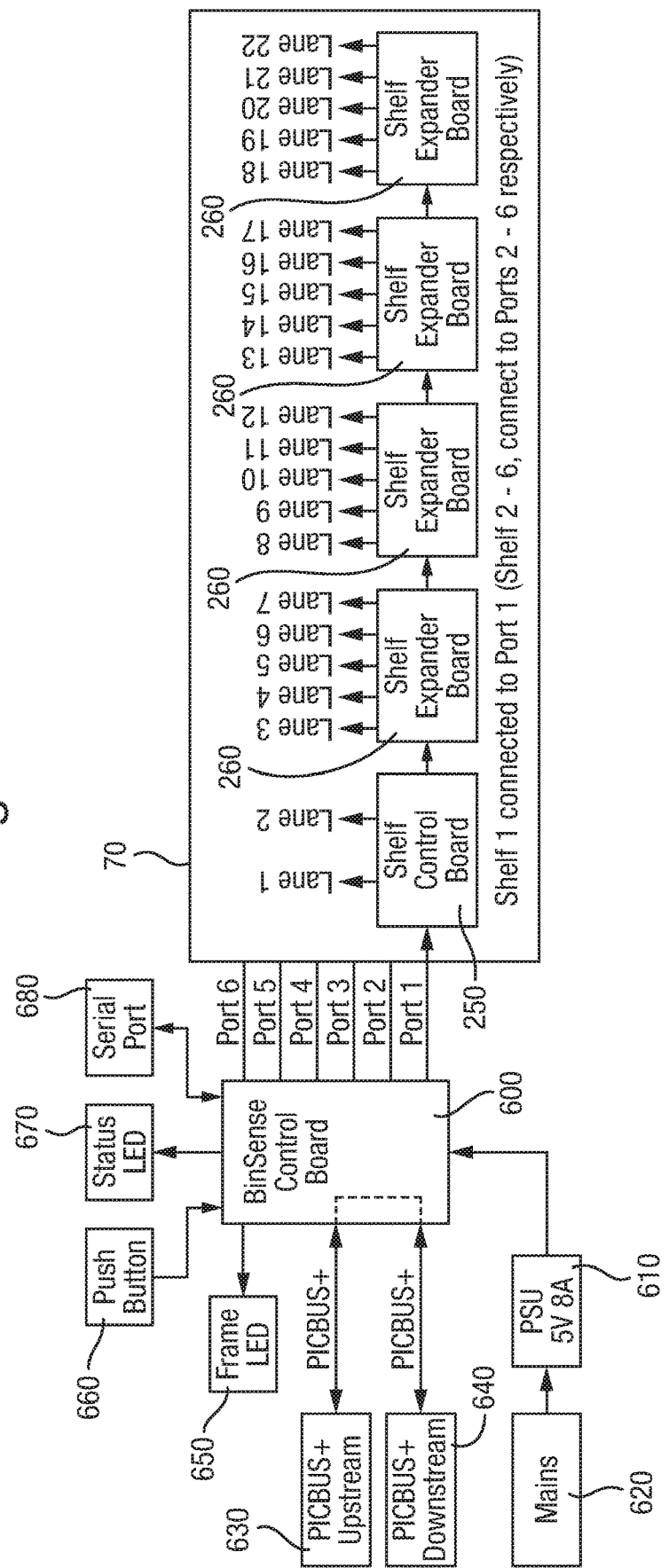
FIG. 21 is a schematic view of the control circuitry of the shelving system.

FIG. 21 shows a schematic diagram of control circuitry of the shelving system 1. Each shelf 70 in the frame 5 includes a shelf control board 250 (also called shelf controller PCB) and one or more shelf expander boards 260 (also called shelf expander PCB), which may be collectively termed shelf boards 250, 260. There are four shelf expander boards 260 in the present embodiment.

The shelf boards 250, 260 in each shelf are interconnected by an expansion interface 255, which is daisy-chained through each shelf board 250, 260. Each shelf board 250, 260 includes a microcontroller (not shown). Likewise, each sensor PCB 450, 460 may include a microcontroller, although this is not essential. In addition, each shelf control board 250 includes connectors 265 for two lanes (two primary rails) and each shelf expander board 260 includes connectors 265 for five lanes (five primary rails), although it will be apparent that not all these connectors 265 need be used in a particular configuration of a shelf 70. Thus, in total each shelf 70 includes connectors 265 for 22 primary rails (and hence lanes).

In addition, the circuitry includes a frame controller (frame control board) 600 which is mounted at any suitable location to the frame 5. In the present embodiment, there are six shelves 70 and the frame controller 600 includes six ports for connecting to their respective shelf control boards 250. Preferably, the connectors 265 for the expander boards 260 are 6-way ribbon cables as are the daisy chain cables 255, although other connections such as RJ45 ports could be used.

The frame control board 600 is connected to mains power 620 via a power supply unit PSU 610. The frame control board 600 also enables internet connection via PICBUS+ upstream and downstream modules 630, 640 to multiple frames 5 in the shelving system 1. In addition, the frame control board 600 is connected to one or more frame LEDs 650 and to one or more status LEDs 670 to display the status of the frame 5 as a whole. The frame controller 600 can be individually controlled via a computer (not shown) through serial port 680, which acts as a local terminal, and provides a local diagnostic and configuration port for a technician to interrogate the shelving system 1 with a dumb terminal. The frame controller 600 may also be provided with a push button 660 for example for a test mode. Preferably, the frame control board 600 also includes a plurality of jumpers for setting the frame number (although a frame address could be stored in a non-volatile memory as well or instead).

The frame controller 600 can communicate directly with the shelf boards 250 in parallel, and can determine which shelf is being addressed based on the port number. The frame controller 600 is capable of current limiting and fault monitoring for each of the shelves 70. If any port tries to draw an amount of current above a predetermined threshold, the frame controller 600 can shut down the corresponding shelf 70 and signal an alarm.

In a similar way, each shelf control board 250 monitors and controls power to all shelf expander boards 260, allowing individual expander boards to be shut down if a fault arises. In an alternative implementation, each shelf board 250, 260 could be capable of current limiting and fault monitoring for the next shelf expander board 260 in the daisy chain. If a downstream port in the daisy chain were to draw an amount of current above another predetermined threshold, the shelf control board 250 would shut down the lanes associated with the shelf expander board 260 and signal an alarm.

In a similar way, each shelf board 250, 260 is capable of current limiting and fault monitoring for all the lane connectors 265 together. Thus, a shelf expander board 260 and all its lanes can be shut down, with a fault in one lane in the group of lanes on that shelf expander board 260. In one embodiment, the isolation of a group of lanes on a shelf expander board 260 is autonomous and will only be reported upwards when polled. Similar considerations apply in respect of the shelf control board 250. However, in an alternative embodiment each is capable of current limiting and fault monitoring for each of the lane connectors 265 separately.

If sensors 700 try to draw an amount of current above another predetermined threshold, the shelf board 250, 260 can shut down the sensors 700 and signal an alarm. In preferred embodiments it may also be possible to shut down a single sensor 700 and raise an alarm in a similar way using control on the separate sensor 700 boards 450, 460. Alternatively, if a primary rail 40 tries to draw too much current, this may be reported to the shelf control board 250, which may shut down all the lanes associated with the board to which the primary rail 40 is connected.

In addition, each shelf board may assign or include information relating to the lane numbers it is associated with, as shown in FIG. 21. Specifically, since the shelf control board 250 is always connected first in the shelf 70, it knows that the respective socket connectors 265 are for lanes 1 and 2. Each of the shelf expander boards 260 is programmed to receive an instruction from the preceding shelf board 250, 260 that it is board number n, and to pass on to the next shelf expander board 260 that the next shelf expander board 260 is board number n+1. The shelf expander boards 260 are further programmed so that if the received number is n=max (where max=the number of shelf expander boards 260, in the present embodiment, 4), there is no next shelf expander board 260. The value of n is a soft parameter passed to the boards or programmed in a non-volatile EEPROM on the respective boards. When determining lane numbers along the shelf 70, the shelf control board 250 is programmed to instruct the first lane expander board 260 that n=1, the number of the next shelf expander board 260 is set as n=2, and so on. Thus, the shelf expander boards are consecutively numbered as 1 to max (1-4 in the present embodiment). The shelf expander boards 260 are then able to determine that the x lanes with which they are associated (x=5 lanes for each shelf expander board 260 in the present embodiment) are lane numbers [(n−1)x+y+z] for each of y=1 up to y=x, where z is the number of lanes on the shelf control board 250. Thus, in the present embodiment, where x=5 and z=2, the lane numbers on the $n^{th}$ shelf expander board 260 are 5(n−1)+3, 5(n−1)+4, 5(n−1)+5, 5(n−1)+6 and 5(n−1)+7. Of course, the skilled addressee will recognise that there is no requirement to use four shelf expander boards 260, to provide five lanes on each shelf expander board 260 or to provide two lanes on the shelf control board 250, and any suitable values for n, x, and z may be chosen.

Consequently, the shelf control board 250 and the shelf expander boards 260 can send back to the frame control board 600 information about the status of the two sensors 700 on each of their respective lanes, along with the lane number to which that status applies. Thus, the frame control board 600 can determine for each lane whether a shelf bin 60 is on each of the sensors 700 in the lane and to control the shelf boards 250, 260 to illuminate the LEDs 267, 268 corresponding to a lane based on the status of that lane. Depending on the status of the lane, the frame control board 600 is also able to place an order for stock for any lane using a software interface with an external stock control system or to indicate an order is required to be placed depending on the specific implementation, and to receive a status of the stock order from the stock control system, which can be connected via the PICBUS+ control modules 630, 640 and/or the serial port 680.

The shelf control board 250 is provided with a common sync clock, signals of which are provided to each of the shelf expander boards 260 on the shelf 70. In this way, all the LEDs 267, 268 can be made to flash synchronously across the shelf 70. In addition, the frame control board 600 periodically sends a data packet to all shelf control boards 250 simultaneously to reset their respective sync clocks. In this way, all the LEDs 267, 268 across the frame 5 can be made to flash together.

An exemplary use of the shelving system 1 of the embodiment will now be described with the aid of the state diagram shown in FIG. 22, in which solid lines show changes in state resulting from actions of a user of the shelving system 1 and dashed lines show changes in state resulting from interactions with the external stock control system. The state diagram represents the changes in state of a lane and how the LEDs 267, 268 for that lane are controlled.

In state 0, the lane is not configured and the LEDs 267, 268 are switched off. This may be, for example, because there has been an overcurrent detected for that lane (primary rail 40), for the block of lanes on the shelf board 250, 260 with which the LEDs 267, 268 are associated, or for the shelf 70 or frame 5 as a whole.

When a lane is enabled and fully stocked, it is placed in state 1, which is the normal state. This means that both sensors 700 indicate that a shelf bin 60 is present—in other words, there are two bins 60 on the lane: a front, lower bin (first bin) and a rear, upper bin (second bin). The bins 60 are both assumed to contain predetermined stock items, for example, screws, washers, bolts, components or other parts used in a manufacturing process. Consequently, it is assumed that there is sufficient stock of the items in the lane and the LEDs 267, 268 are switched to display a solid green light (green on).

It should be appreciated that each lane may include different types of item, or that some or all of the lanes may include the same stock item. A record of which items are in which lanes may be stored in any of the corresponding shelf boards 250, 260 with which the lane is associated, in the shelf control board 250 for the shelf 70 in which the lane is provided, the frame control board 600 or even the external stock control system. A record may also be kept of the predetermined maximum number of stock items in each bin when it is first filled/refilled.

The two sensors 700 of the lane are polled at a predetermined interval. If the user removes either bin 60 from the lane, the sensors 700 indicate that there is a bin missing and the lane moves to state 2. The LEDs 267, 268 flash green (green flash) to indicate a bin is missing. If the user replaces the bin 60 the right way around within a predetermined period, the lane returns to state 1 (green on).

As the user carries out the manufacturing process, the user picks items out of the first bin 60 until they are exhausted. When the first bin 60 is empty, the user removes it from the shelf 70 and the second bin 60 slides forward to replace it, due to the angling of the first and second rails 40, 50. The user is then able to take stock from the second bin 60, which is now at the front. The user can either leave the first bin 60 to the side or he can place it back in the lane behind the second bin, but upside down. The lanes and bins 60 are sized such that if a bin 60 is placed upside down at the back of the lane, it does not depress the domed surface 4332 of the rear sensor 700.

Thus, the sensors 700 initially indicate that there is a bin 60 missing and the lane moves to state 2 (green flash) but when the bin 60 is not replaced within the predetermined time, or is replaced upside down, the lane moves to state 3 (amber flash). In state 3, the system 1 determines that the lane is low on stock and places an order with the external stock control system to fill the bin 60 (or for a full bin 60) for that lane.

Upon receiving confirmation of the order, the lane is moved to state 4 (amber on) to indicate that the lane is low on stock but one bin 60 of stock has been ordered. If the stock is received (the order is delivered and confirmed by the user with the external stock system) and the full bin 60 is placed in the lane, the lane is moved back to state 1.

If the second bin 60 is then removed before the order has been delivered, so there are no bins 60 present for a predetermined amount of time, the lane moves to state 6. This means there are no bins 60 in the lane so the lane is considered to be out of stock, with one bin 60 of stock being on order. In state 6 the LEDs 267, 268 alternate red and amber on.

The system 1 places a further order for stock and once this is confirmed the lane moves to state 7 (red on) in which stock is out but two bins 60 of stock are on order.

Conversely, when in state 3, if before the order is placed and confirmed, the second bin 60 is also removed and it is detected that there are no bins 60 for longer than a predetermined amount of time, the lane moves to state 5 (red flash). In state 5, there are no bins 60 in the lane and the lane is considered to be out of stock, without any stock being on order.

The system then places an order for two bins 60 of stock. If only one is confirmed, the lane moves to state 6, as described above, but if both are confirmed, the lane moves to state 7, as described above.

It will be apparent that if an order is delivered and confirmed, the lane will move back to state 1 (or state 6 if stock is out and only one bin 60 of stock is delivered).

It will also be apparent that this is an exemplary use only and that states, predetermined times and LED signals can be configured in any appropriate manner. In a preferred embodiment, the states in the state diagram are predetermined and during set up the user can select from any of a fixed number of values for each variable, such as the predetermined time required to be passed before moving to another state, or how the LEDs display. For example, the bin 60 missing times needed to transition between states can take values anywhere between 5 seconds and 1 day. Different bin 60 missing times can be selected for transitioning between different states. The values available to select for the different bin 60 missing times may be the same or different.

The present invention as described above provides significant advantages. In particular, the present invention provides an easily configurable shelf system 1 in which shelf bins 60 of varying widths can be guided down lanes of corresponding width. This allows an optimum layout of bins 60 in a shelf 70 and in a frame 5, in view of the different types of stock item and the size of the frame 5. Moreover, because each lane is formed of an intelligent primary rail 40 in which the sensing electronics are provided and a dumb secondary rail 50 without electronics, assembly and reconfiguration of the shelf system is easier.

Because the primary and secondary rails 40, 50 each include a supporting portion 415, 515 which support the weight of the bins 60, it is not necessary to include a separate supporting plane or other surface on which the bins 60 can slide. This reduces the weight of the system 1, makes the system 1 easier to assemble and, after manufacturing, to pack it for transport and subsequent assembly.

In addition, because the sensors 700 are provided in the supporting portion 415 of the primary rail 40 it is an easy matter to sense the presence of the bins 60 and to move the sensors 700 when the lanes have been reconfigured. It also makes it easy to sense the presence of a bin 60 when it is the right way around and to sense a bin 60 missing even when it is placed back in the lane upside down. This type of sensing is made considerably easier by the fact that the sensors 700 work by depressing the domed surfaces 4332.

The sensor 700 of this embodiment is particularly advantageous for several reasons. These include that, since the front and rear sensor PCBs 450, 460 are mounted to the primary rail 40 separately from the interrupter assemblies 430, the moving parts of the sensor 700 are isolated from the electrical components, which makes the sensors 700 particularly robust. As there are no electrical moving parts, the life of the switch is unaffected by movement of electrical connections, which would be likely to cause failure over repeated use of another sensor switch. In addition, oxidation of the conductive parts of the sensor do not affect whether a circuit is made or broken, further increasing the life of the sensor 700.

The interrupter housing 4310, interrupter 4330 and collar 4340 can all be cheaply made of hard-wearing, moulded plastic such as ABS, improving cost of manufacturing and longevity of the sensor 700.

A further advantage is that the different components of the sensor 700 can be easily mounted to the primary rail, improving ease of manufacture.

By using a domed surface 4332 projecting above the surface of the support portion 415, the presence and absence of storage bins 60 can easily be detected when the bins 60 are slid over the domed surface 4332 in either direction, without the bins catching on the domed surfaces 4332 or being stopped from moving. Similarly, as there are no sharp or abrupt edges, clothing, fingers and so forth cannot snag on the sensor 700 and damage it. The sensor also cannot be damaged by pushing the domed surface 4332 to the side. In addition, since downward travel of the interrupter main body 4330 is limited by the well, it is very difficult to damage the sensor 700 by pressing too hard on it. These issues would be problematic were a leaf spring or other moving component to be used.

Consequently, it will be apparent that the sensor 700 of the present invention is extremely robust, as well as cheap to make and easy to fit.

By providing the pattern of the mounting components on the front cross member 20 and the rear cross member 30, it is easy to configure lanes of different widths, where the widths of the lanes are not multiple integers of each other. Moreover, the pattern used allows both primary rails 40 and secondary rails 50 to be mounted in the same place, depending on the desired lane configuration, further improving space efficiency and increasing configurability.

By providing the primary and secondary rails 40, 50 with rear mounting lugs 440, 540 that have feet 541 that sit behind the upper portion 342 of the rear cross member 30, and with dowels, rods, screws or similar front mounting lugs 510, it is easy to locate the rear end of the rails 40, 50 in the rear cross member 30 and then to fit the front mounting lugs in the front cross member 20. This improves ease of assembly and reconfiguration.

The provision of the shelf control board 250 and the shelf expander boards 260 makes it easier to manufacture front cross members 20 and hence shelves of different lengths with different numbers of positions for the primary rail 40 whilst maintaining all the advantages of configurability. The only change to the components required for a longer shelf is to provide a longer front cross member main body 240, a longer front cross member cover 220 and a longer rear cross member 30. More of the same primary and secondary rails 40, 50 can be supplied for the longer shelf, and additional shelf expander PCBs can be fitted to the front cross member main body 240. It also makes it easy to swap out individual components in case of fault with a minimum degree of cost in terms both of components and labour. Similar considerations apply in the use of different sensor 700 circuit boards 450, 460 for the respective sensors 700.

In addition, by using separate sensor 700 circuit boards 450, 460 it is an easy matter to include different numbers of sensors 700 in primary rails 40 of different lengths or different sensor spacings. The only components that need to change are the upper rail portion 410 and the lower housing 420.

Similarly, because each front cross member 20 and each primary rail 40 is provided as a self-contained unit, the system 1 can be easily assembled and configured with varying numbers of shelves 70. For example, in the present embodiment it would be possible to configure the frame 5 with only five shelves instead of six, and no change in programming or electronic set up would be required.

Manufacturing and assembly of the system 1 are also very easy. During manufacturing, it is only necessary to connect the sensor PCBs 450, 460 in the primary rail 40 to each other, and the shelf boards 250, 260 in the front cross member 20 to one another. This means that the primary rail 40 and the front cross member 20 can be shipped as preassembled components along with the rest of the system 1. During assembly, it is only necessary to connect each primary rail 40 into a corresponding connector 265 of a front cross member 20, and then to connect each shelf control board 250 into the frame control board 600. It is then possible to determine automatically which shelves 70 have been connected and where primary rails 40 have been connected along a shelf, and hence which lanes exist and where.

Since the uprights 10 can be fixed to the frame 5, the front cross members 20 and rear cross members 30 can be fixed to the uprights 10, and the primary and secondary rails 40, 50 can be fixed to the front and rear cross members 20, 30, the system 1 can be shipped in flat pack form and assembled quickly and easily on site with the desired configuration.

Moreover, the use of a frame control board 600 connected to the shelf control board 250 and hence to the shelf expander boards 260 gives rise to monitoring and control of each of the bins 60 in each of the lanes. By connecting the frame control board 600 to an external stock control system, it is possible to order replacement stock automatically and to signal to a user of the system 1 not only the states of stock high, stock low and stock out, but also the order status using the LEDs 267, 268.

The electrical configuration is also advantageous. In particular, it is possible to keep a track of the status of each lane without a complicated addressing scheme. Rather each lane number on each shelf can be allocated automatically. In addition, by using current limiting in the manner discussed above, it is possible for one lane, one block of lanes or one shelf to malfunction without killing other lanes, blocks or shelves. In addition, it is possible to tell which lane, block or shelf has malfunctioned.

In addition, it is possible to configure each of the shelf boards 250, 260 to scroll illumination of green, amber and red on power up so that faulty boards/lanes can be spotted.

Embodiments of the present invention have been described by way of example only. However, it will be apparent to those skilled in the art that various modifications may be made without departing from the scope of the invention as defined by the appended claims.

In this specification and in the claims, unless otherwise specified, the expression "LED" includes a single LED or an LED package including LEDs of two or more colours. Although two LED packages 267 and 268 are provided in the present embodiment it is possible to provide a single LED package or more than two LED packages. By using two LED packages, it is possible to make the display brighter, for example by causing both packages to emit green light continuously. Given that in preferred embodiments the LEDs will be switched on most of the time, the use of one or more extra LED packages also builds in redundancy. If both LED packages are lit at the same time, even if one fails the other can be expected to continue working. Alternatively, one of the LED packages can be used until it fails after which another LED package can take its place.

It is not necessary to use LEDs and any suitable indicator can be used, including lights, mechanical flaps and so on. In addition, any suitable colours or combinations of colours can be used whether the indicators are LEDs, lights, flaps, switches or another type of indicator. It is not necessary to use colours at all.

In the embodiment described above, the shelf control boards 250 are connected in parallel to different ports on the frame control board 600. Alternatively, it would be possible to use serial, multi-drop communications, with each of the shelf control boards 250 being connected to the same bus and including an address (for example, stored in a memory or hardwired in the form of jumpers).

In the embodiment shown the drawings, the whole of the bottom of the bins 60 is flat. This makes it easier to ensure that the presence of the bins 60 is properly detected in the lanes since the bottom of a bin 60 will depress the domed surface 4332 of a sensor 700 even if the lane is wider than the bin 60 and there is some play allowed for the bin 60 to move in the width direction in the lane. However, other types of bin 60 are possible, such as linbins in which the bin 60 typically includes rails on the bottom. So long as the rails are supported by the support portions 415, 515 of the primary and secondary rails 40, 50 and will depress the domed surface 4332, there is no problem. Where the rails on the bottom are directly below the top edges of the bin 60 (that is, there is no draught) however, it may be difficult to replace an empty bin 60 upside down in the lane without it being sensed as present. In this case, empty bins 60 are simply placed to one side of the frame 5.

It is not necessary to use bins 60 of the sizes described above, and any suitable size or sizes can be used. Another example of a different type of bin 60 that could be used is a BITO® bin in place of or at the same time as the AKRO-MILS® type (preferably in different lanes or shelves 70). Different types of bin 60 are easily accommodated in the present invention, for example by providing a different secondary rail 50 which accommodates the variance in bin width but gives the ability to maintain the same location pitch across the front and rear members. In this case, the secondary rails 50 will have mounting features in the same positions as the original secondary rails 50 but the width of the support portion 515 and/or the position of the upright guide portion 517 relative to the mounting features may be adjusted as appropriate. In addition, or instead, modified primary rails 40 may be used.

In general terms, the preferred sensor seeks to sense an adjacent surface of the bins 60 and, or instead, preferably also senses a continuous face of the bins 60 and does not sense an open face. In the main embodiment described above, the flat, bottom surface of the bin 60 can be considered to be a continuous face and the opening at the top can be considered to be an open face. However, the continuous face could be a surface along the side of the bin 60 or a surface along a bottom rail, whereas the open face can be any opening, for example one that is large enough to place and remove the desired items in and from the bin 60.

It is not necessary to use the shapes shown and described for the mounting features. For example, the mounting notches 310 in the rear cross member 30 need not extend to the rear surface 343 so long as the feet 441, 541 can be positioned through the mounting notches 310 and the legs made to abut the notch 310. For example, the notches 310 may simply be circles or teardrop-shaped holes in the upper surface 342, which the feet will fit into. It is also not necessary to use the protrusion 340 to split the mounting notches 310 into separate mounting parts 390, 395—different mounting notches can be used instead. Conversely any or all notches 310 can be split into different mounting parts using protrusions 340.

It would also be possible to switch the mounting features between different ends of the primary and secondary rails 40, 50, and to switch the mounting features between the front cross member 20 and the rear cross member 30. In addition, the mounting features on the front and rear cross members 20, 30 could be provided on the primary and secondary rails 40, 50 and vice versa. Thus, the lugs could be on the cross members and slots/holes on the rails.

It is also not necessary to provide any of the lugs with feet 441, 541—simple dowels or rods could be used for all mounting lugs, or other shapes or styles of mounting lugs could be used.

It is not necessary to adopt the described pattern of mounting features on the front cross member 20 and the rear cross member 30, and the skilled addressee will be able to envisage different mounting patterns with different dimensions and different numbers of possible lane widths.

It is not necessary to provide separate primary and secondary rails 40, 50. Instead they could be combined in the form of a single upright 417 with a primary support portion 415 with sensors 700 on one side, and a secondary support portion without sensors 700 on the other side.

The sensors 700 of the present embodiment use a light emitter 451 and a light receiver 452. However, they need not emit light, or at least visible light. In addition, other types of sensor 700 may be used, for example a leaf spring that is depressed by a bin 60 to make a circuit and so detect the presence of the bin 60. It is not essential to provide the sensor 700 with a domed surface 4334 and other shapes are possible, including ramps which slope forwards and/or backwards along the lane.

Any suitable biasing means may be used in place of the coil spring 4320.

It is not essential to provide the sensors 700 on the support portion 415. Instead, they could be provided on the upright guide portion 417, although in this case it may be difficult to reliably sense the presence bins 60 with a draught (in other words, where the bottom of the bin 60 is narrower than the top) and to distinguish between bins 60 that are the right way around and upside down.

In the present embodiment, two sensors 700 are provided for two respective bins 60. However, it is not necessary for the sensors 700 and bins 60 to be provided with a one to one correspondence and fewer or more sensors 700 can be provided than bins 60 will fit in the length of a lane. In addition, a lane may include three or more sensors 700 for three or more bins 60.

In this specification, 'front', 'back', 'rear', 'upper', 'top', 'over', 'lower', 'bottom', 'under' and like terms are relative terms and are not intended to be limiting unless otherwise stated. It is not necessary for the cross members 20, 30 to be provided right at the front and back of the frame 5, and the primary and/or secondary rails 40, 50 can overhang them both at the front and the rear. It is also not necessary to provide separate front and rear cross members 20, 30 and, for example, they can be formed of a single plate.

At least one LED is preferably provided corresponding to each position of primary rail, however even this is not essential.

In the described embodiment, PCBs are used. However, any type of board and connector may be used for the sensor, shelf control, shelf expander and frame control boards (450, 460, 250, 260, 600).

In addition, the sensor boards 450, 460 could be individually connected to the shelf boards 250, 260 instead of being daisy-chained. In a similar manner, the shelf expander boards 260 could be individually connected to the shelf control board 250 instead of being daisy-chained. Both or all sensors 700 could use a single sensor board, and a single shelf board could also be provided in place of multiple shelf boards. Thus, there may be any number of lanes associated with a shelf board 250, 260 (for example by varying the number of connectors 265) and there may be any number of shelf boards (including one or none).

In the embodiment described above, the primary rail 40 is attached using a screwdriver and the secondary rail 50 is attached without using any tools. However, either or both rails 40, 50 can be attached without using tools, or by using a screwdriver or any other appropriate tool.

It is preferred that the system is shipped for assembly on site, but with the primary rails 40 and the front cross member pre-assembled.

Figure 22:
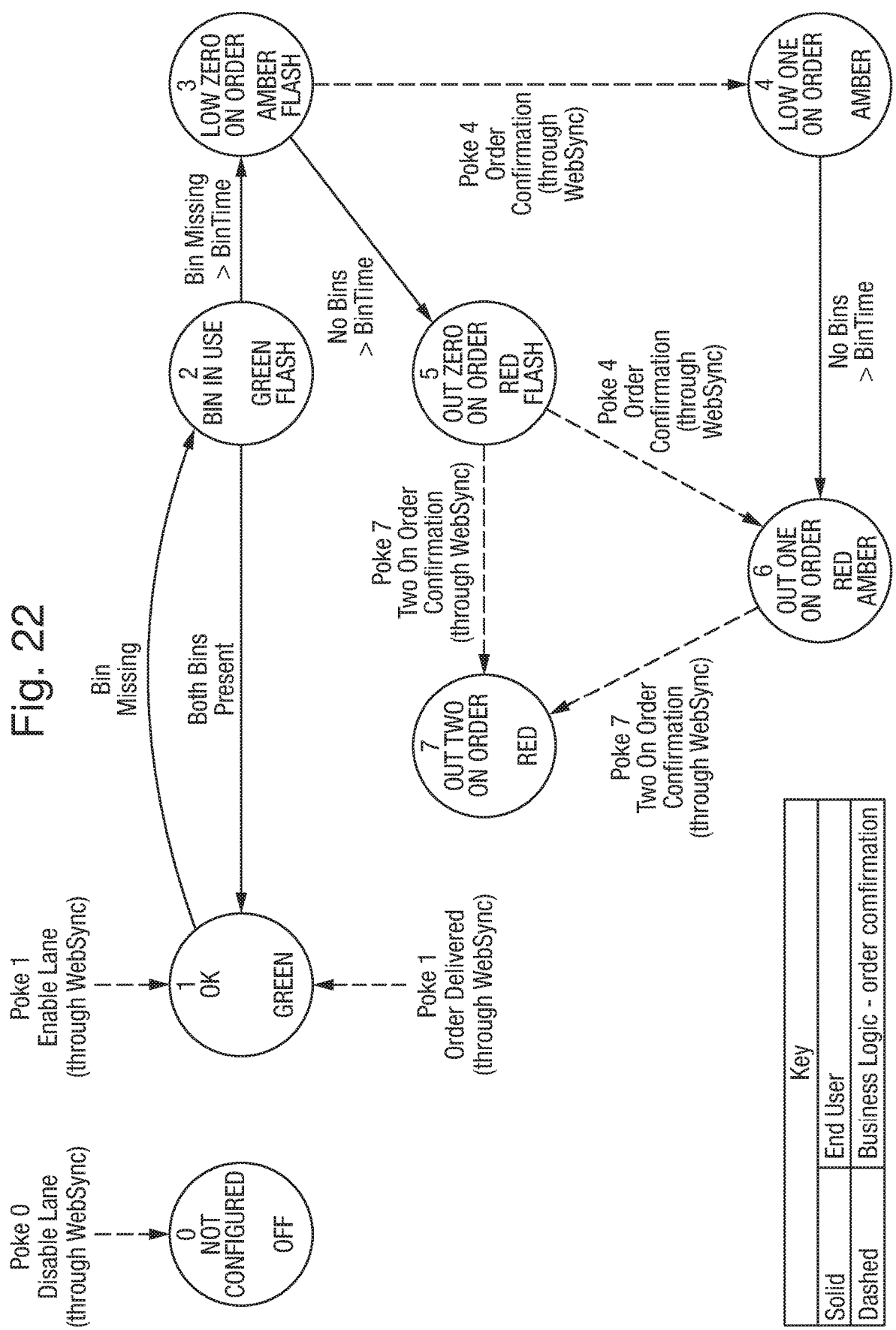
FIG. 22 is a state machine diagram of the operation of the shelving system.

As noted above, it is also envisaged that the state machine shown in FIG. 22 can be extended or otherwise varied with different fault states and actions. For example, where a replacement bin 60 has been delivered in state 6 (out, one on order), the state may move to state 3 (low, zero on order). Similarly, where a replacement bin 60 has been delivered in state 7 (out, two on order), the state may move to state 4 (low, one on order). Again, where a replacement bin 60 has been delivered in state 4 (low, one on order), the state may move to state 1 (OK).

State 0 (not configured) may also occur where the system is powering up or has recovered from a hardware error and is waiting for the external system to set the state. Additional states may also be included, for example state 10—error, divider not fitted; state 11—error, divider broken; state 12—error, lane fault; state 13—error, shelf expander board fault; state 14—error, shelf fault. The state machine may be moved to and from these states by action of the software and/or hardware.

The invention claimed is:

1. A shelf system comprising:
   a frame configured to support at least one shelf, and a plurality of primary and secondary rails, wherein:
the frame includes a first cross member and a second cross member, to which respective parts of the primary and secondary rails are mounted,
the frame comprises a plurality of mounting portions, to each of which at least one of a primary rail and a secondary rail is removably mountable to form lanes of different widths,
each lane includes a primary rail on one side and a secondary rail on the other side for supporting and guiding at least one item in the lane,
the primary rails each comprise at least one sensor for sensing the at least one item in the lane, and
the mounting portions comprise:
pairs of mounting portions on the second cross member, the mounting portions in a pair being spaced apart by a first distance, and the pairs of mounting portions being spaced apart by a second distance (P);
primary rail mounting portions on the first cross member corresponding to one of mounting portions of the pairs of mounting portions on the second cross member; and
secondary rail mounting portions on the first cross member corresponding to both the mounting portions of the pairs of mounting portions on the second cross member.

2. A shelf system according to claim 1, wherein the primary rail and the secondary rail comprise lugs at opposite ends for engaging with the mounting portions, wherein:
a first lug at one end of the primary and secondary rails comprises a projection,
a second lug at the other end of the primary and secondary rails comprises a foot and a leg of smaller width than the foot,
the pairs of mounting portions are slots or openings through which the foot can be introduced so that the leg abuts the second cross member, and
the primary rail mounting portions and the secondary rail mounting portions on the first cross member are holes sized to receive the projection.

3. A shelf system according to claim 1, wherein each rail of the plurality of primary and secondary rails comprises a support portion for supporting the weight of part of the item and an upright projecting upwards from the supporting portion for guiding the item in the lane.

4. A shelf system according to claim 1, wherein the frame comprises an indicator for each lane, the position of the indicator relative to the position of the primary rail being the same for each lane.

5. A shelf system according to claim 1, wherein the at least one shelf comprises at least one shelf board, wherein the at least one sensor of each primary rail is connectable to a corresponding shelf board.

6. A shelf system according to claim 5, wherein the at least one shelf board comprises separate electrical connectors for connecting a respective plurality of sensors.

7. A shelf system according to claim 5, wherein each primary rail comprises at least one sensor having a respective sensor board which is connected to a shelf board.

8. A shelf system according to claim 7, wherein a number or address is assigned to each lane via a shelf board associated with it.

9. A shelf system according to claim 5, wherein in response to determining at least one of a primary rail and a shelf board of the at least one shelf board draws a current above a predetermined level, the at least one of the primary rail and the shelf board is shut down and a notification is given.

10. A shelf system according to claim 5, wherein each of the at least one shelf board comprises a shelf control board connected to a frame controller and at least one shelf expander board connected to the shelf control board.

11. A shelf system according to claim 10, wherein in response to determining the shelf control board draws a current above a predetermined level, the shelf is shut down and a shelf notification is given.

12. A shelf system according to claim 10, wherein
the each of the at least one shelf board is provided with indicators corresponding to the lanes, and
the shelf control board is provided with a sync clock, whereby indicators in a shelf are controlled with a same timing.

13. A shelf controller according to claim 12, comprising a plurality of shelves, wherein the frame controller is configured to send to all shelf control boards in the frame a data packet to reset their respective sync clocks, whereby indicators in the frame are controlled with substantially the same timing.

14. A shelf system according to claim 1, wherein the item is a storage bin and the at least one sensor is adapted to sense a continuous face of bin and not to sense an open face of a bin.

15. A shelf system according to claim 1, wherein the at least one sensor comprises:
an emitter and a receiver which are provided on one side of the primary rail; and
an interrupter arranged to be moved by the item on an opposite side of the primary rail in the lane to interrupt a signal between the emitter and receiver.

16. A shelf system according to claim 15, wherein:
the emitter and receiver are provided on a board mounted to the one side of the primary rail;
the interrupter is provided in a housing mounted on the one side of the primary rail;
the interrupter includes a main body with a domed or sloped surface which projects above the opposite side of the primary rail and a projection for moving between the emitter and receiver; and
the interrupter is biased away from a position in which the projection is between the emitter and receiver.

17. A shelf system according to claim 1, wherein the system is configured to determine whether one or more items is present in a lane and, in response to determining fewer than a predetermined number of items is present in the lane, place a corresponding stock order.

18. A shelf system according to claim 1, wherein the system is configured to display a status of each lane using at least one indicator corresponding to that lane.

19. A shelf system according to claim 1, comprising multiple frames each with one or more shelves.

* * * * *